(12) United States Patent  
Ohtani

(10) Patent No.: US 8,239,588 B2  
(45) Date of Patent: Aug. 7, 2012

(54) SYSTEM AND METHOD FOR IMPROVED I/O NODE CONTROL IN COMPUTER SYSTEM

(75) Inventor: Atsuhisa Ohtani, Tokyo (JP)

(73) Assignee: NEC Corporation, Tokyo (JP)

(*) Notice: Subject to any disclaimer, the term of this patent is extended or adjusted under 35 U.S.C. 154(b) by 523 days.

(21) Appl. No.: 12/416,643

(22) Filed: Apr. 1, 2009

(65) Prior Publication Data

US 2009/0254917 A1 Oct. 8, 2009

(30) Foreign Application Priority Data

Apr. 2, 2008 (JP) .................................. 2008-095653

(51) Int. Cl.
*G06F 3/00* (2006.01)
(52) U.S. Cl. ........................................................ 710/36
(58) Field of Classification Search ...................... 710/36
See application file for complete search history.

(56) References Cited

U.S. PATENT DOCUMENTS

| 2006/0184939 A1* | 8/2006 | Sahoo et al. .................. 718/100 |
| 2007/0143760 A1* | 6/2007 | Chan et al. .................... 718/102 |

FOREIGN PATENT DOCUMENTS

| JP | 1996147234 A | 6/1996 |
| JP | 1998303932 A | 11/1998 |
| JP | 2000148705 A | 5/2000 |
| JP | 2001195268 A | 7/2001 |
| JP | 2003316752 A | 11/2003 |
| JP | 2006127463 A | 5/2006 |
| JP | 2006318477 A | 11/2006 |
| JP | 2007115246 A | 5/2007 |

OTHER PUBLICATIONS

Japanese Office Action for JP2008-095653 mailed Mar. 19, 2010.
Jose Moreira et al, "Designing a Highly-Scalable Operating System: The Blue Gene/L Story", In Processing of IEEE/ACM Supercomputing SC'06, Tampa, Nov. 2006.

* cited by examiner

*Primary Examiner* — Henry Tsai
*Assistant Examiner* — Juanito Borromeo
(74) *Attorney, Agent, or Firm* — Michael Dryja

(57) ABSTRACT

A computer system is provided with a file system storing data; a plurality of I/O nodes which are adapted to access the file system; a compute node adapted to execute a job and to issue an I/O request when requiring an I/O operation; and a job server for job scheduling which dynamically allocates an I/O resource of the I/O nodes to a job without stopping execution of the job. The job server includes an I/O node scheduler adapted to, when being not able to fully secure an desired amount of the I/O resource of the I/O nodes required by the job in starting the job, secure a part of the required amount of the I/O resource of the I/O nodes, and to allocate the secured part of the I/O resource to the job.

24 Claims, 10 Drawing Sheets

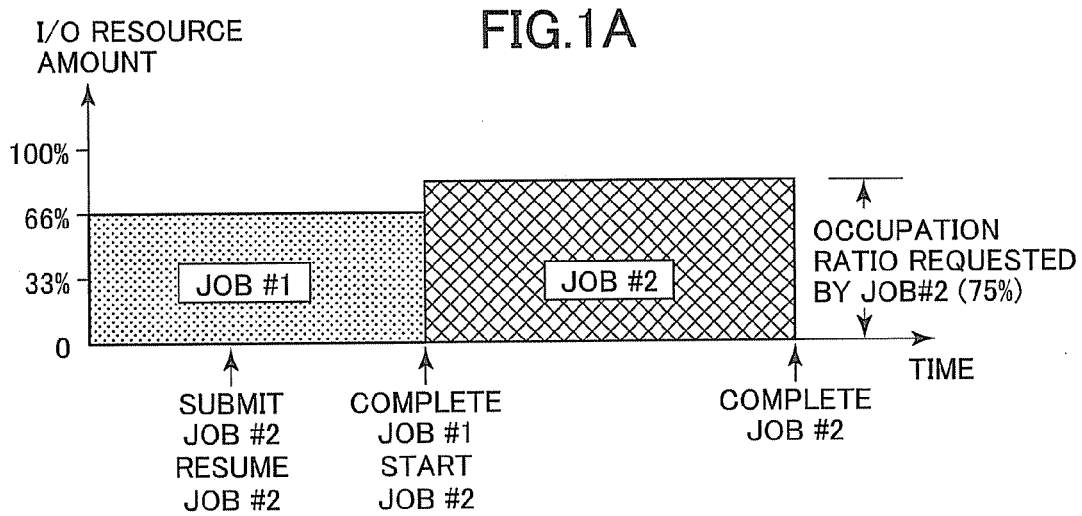
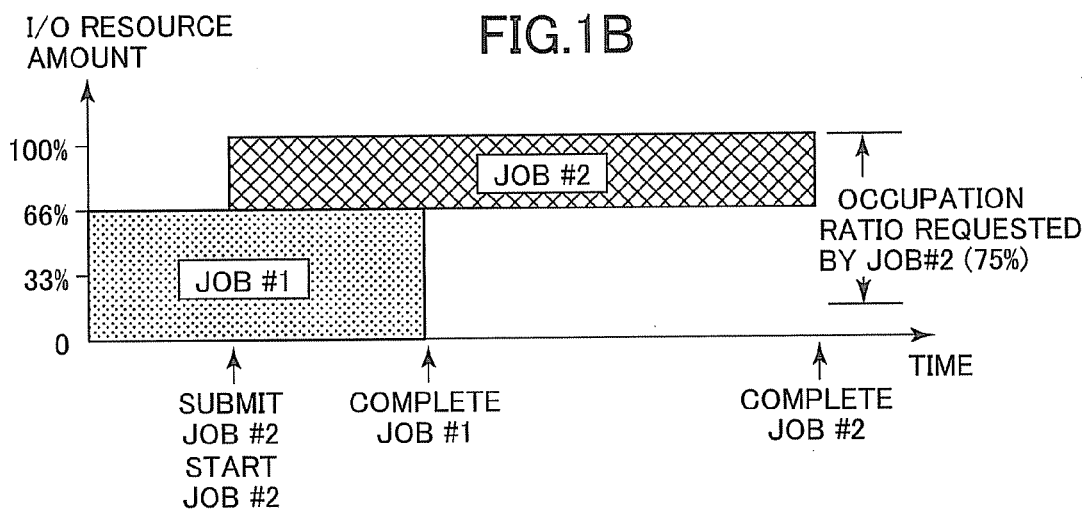
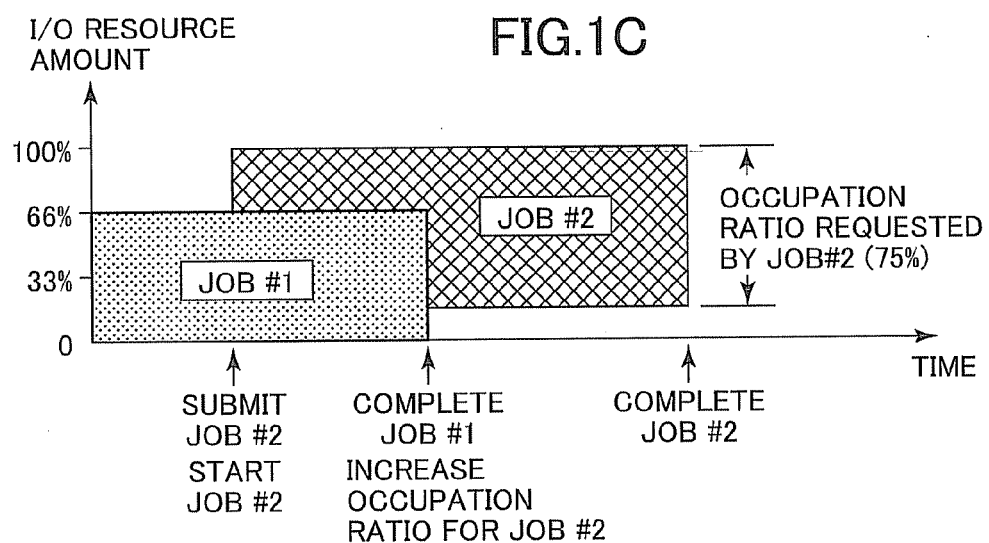

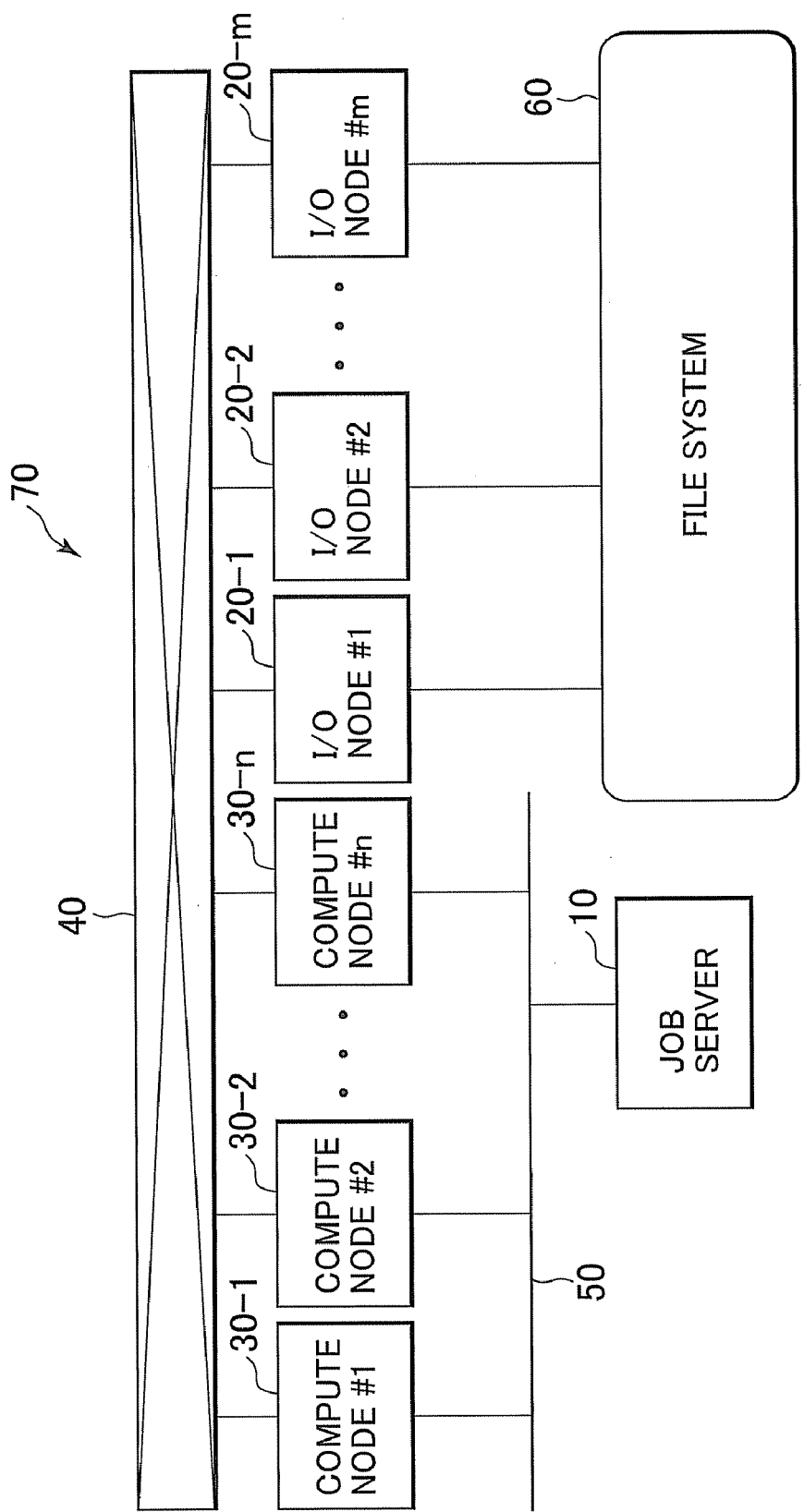

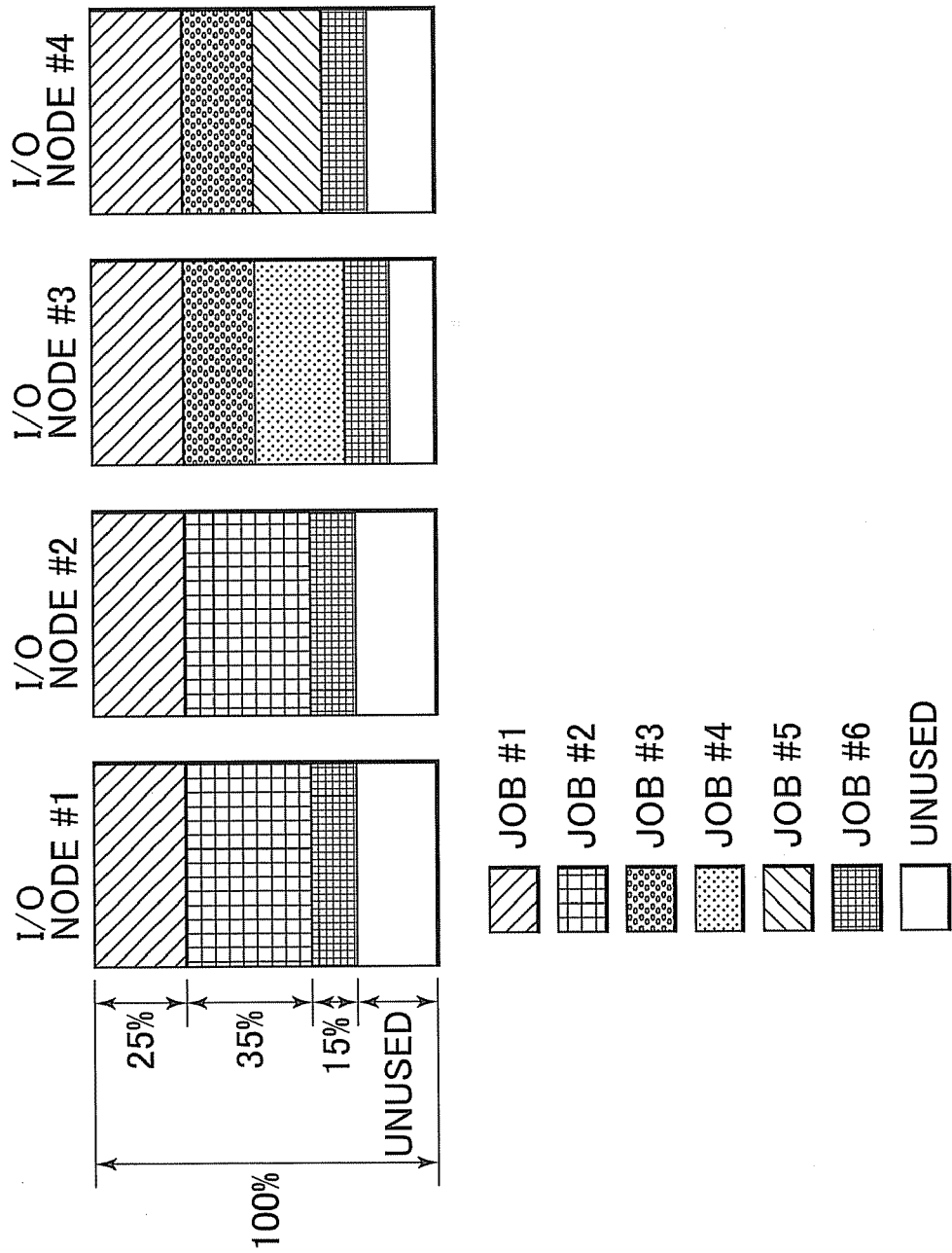

FIG.5

| I/O NODE ID NUMBER | USED PERCENTAGE | MAXIMUM NUMBER OF I/O THREADS | IP ADDRESS |
|---|---|---|---|
| 0 | 20% | | |
| 1 | 20% | | |
| 2 | 100% | | |
| ○○○ | ○○○ | ○○○ | ○○○ |

FIG.6

| JOB NUMBER | COMPUTE NODE ID NUMBER | I/O NODE ID NUMBER | OCCUPATION RATIO | OCCUPATION RATIO SHORTAGE | JOB START TIME |
|---|---|---|---|---|---|
| 100 | 0 | 0 | 40% | 0% | |
| | 1 | 2 | 40% | 0% | |
| | 2 | 1 | 40% | 0% | |
| 250 | 5 | 2 | 60% | 5% | |
| ... | ... | ... | ... | ... | ... |

102-3

SYSTEM AND METHOD FOR IMPROVED I/O NODE CONTROL IN COMPUTER SYSTEM

INCORPORATION BY REFERENCE

This application is based on Japanese Patent Application No. JP 2008-095653, filed Apr. 2, 2008. The disclosure thereof is incorporated herein by reference.

TECHNICAL FIELD

The present invention relates to a computer system and method for operating the same, more particularly, to I/O node control in a computer system.

BACKGROUND ART

In recent years, the I/O data amount used in a computer system has been increased due to the increase in the CPU speed, the memory capacity and the memory band width. Furthermore, various large scale file systems, such as high speed file sharing systems based on a large scale SAN (Storage Area Network) environment and cluster file systems which use multiple file servers, are commonly available, especially in the HPC (High Performance Computing). Moreover, the MPI-IO is supported as a user interface for the parallel I/O in MPI-2 (Message Passing Interface-2) to improve the user's convenience. Such situations enhance the importance of the I/O architecture in the HPC system, necessitating the management of I/O resources required by each job executed on a parallel computer system from the viewpoint of a job management.

Typical job schedulers are, however, mainly directed to the management of the number of CPUS, the number of compute nodes, and the memory capacity, and the I/O resource management is often out of the target of the job scheduling. This may cause inefficient use of I/O resources. In addition, a job scheduler is usually designed to start a job after securing resources required by the job. This undesirably necessitates waiting the job start until all the required resources are completely secured, even when the start of the job is actually possible without securing all the required resources.

Computer systems adapted to dynamic resource allocation are disclosed in Japanese Laid Open Patent Application JP-A 2007-115246 (hereinafter, patent document D1) and Japanese Laid Open Patent Application JP-A 2003-316752 (hereinafter, patent document D2). The system disclosed in the patent document D1 is directed to solve a problem in allocating a resource to an application of interest before another application releases the resource to be allocated to the application of interest. This system, however, suffers from a drawback that a process must be awaited when required I/O resources are not available.

The system disclosed in the patent document D2 is configured to change the resource allocation between the nodes in the operation on the basis of the judgment on whether CPUs, memories and I/O bridges can be allocated to respective nodes. Nevertheless, the system disclosed in the patent document D2 is not adapted to secure resources in accordance with the amounts of the resources required by respective jobs. The system disclosed in the patent document D2 also suffers from a drawback that the dynamic allocation can be executed only in units of hardware resources, for example, in units of I/O bridges. Furthermore, the system disclosed in the patent document D2 is not adapted to time-divisional use of a hardware resource to achieve fine resource allocation. Moreover, the system disclosed in the patent document D2 suffers from a drawback that a process must be awaited when required I/O resources are not available.

One example of the I/O node control method is disclosed in Jose Moreira et al., "Designing a Highly-Scalable Operating System: The Blue Gene/L Story", In Proceedings of IEEE/ACM Supercomputing SC'06, Tampa, November 2006 (hereinafter, Moreira). In the Moreira's system, an I/O process required on a compute node is transferred to a destination I/O node, and an I/O request is issued to a file system on the I/O node.

The Moreira's system implements I/O node control as follows. As described in Section 3.3 of the Moreira document, a file system of interest is set available for an I/O node. Then, an I/O request based on a system call that requests an I/O operation called on a compute node is transmitted to a destination I/O node through a network. This is followed by performing the requested I/O operation for the requested file system on the I/O node by using a daemon called CIOD. When the I/O operation on the I/O node is completed, the CIOD returns the result of the I/O operation to the requesting compute node.

The Moreira's system, however, suffers from a drawback that the amount of the allocated I/O resources is kept constant, independently of the I/O resource amount required by the job executed in the system, and this disables an efficient allocation of the I/O resources. This results from the system architecture in which I/O nodes are not dynamically allocated to the compute nodes; one I/O node and multiple compute nodes are defined as a logical entity called processing sets or psets, as described in Paragraph 3.1 of Moreira.

Japanese Laid Open Patent Application JP-A 2001-195268 discloses a computer system adapted to a resource allocation method based on the service level. This computer system is provided with AP service level specifying means, resource amount determination means, resource allocation means, AP execution means, resource release means and AP execution waiting means. The AP service level specifying means specifies an application service level to each application program and requests the execution of each application program. The resource amount determination means determines the resource amount of each resource allocated to an application program to be executed in accordance with the application program service level specified to the application program to be executed by the AP service level specifying means. The resource allocation means judges whether or not there is room for the resource amount of each resource determined by the resource amount determination means and allocates a desired amount of a resource to the application program if any resource is available. The AP execution means executes the application program with the resource amount of each resource allocated by the resource allocation means. The AP release means releases the resource allocated to the application program when the application program is completed. The AP execution waiting means places the application program to be executed into the waiting state, if there is no room in the resource quantity of each resource determined by the resource amount determining means.

Japanese Laid Open Patent Application JP-A H08-147234 discloses a stream processing apparatus. This stream processing apparatus is provided with an external input/output device, a storage device, a buffer memory, a schedule generator and a stream allocator. The external input/output device receives stream input/output requests from or to outside devices and provides interfacing of the requested streams in parallel at a predetermined standard speed or at the speed of the predetermined multiple. The storage device stores the streams and provides accesses the stored streams in units of blocks of a predetermined data length at an access speed equal to N times the standard speed. The buffer memory is provided between the external input/output device and the storage device and transiently stores the streams in units of blocks. The schedule generator determines multiple unit streams that can be simultaneously supplied at the standard speed and allocates the storage apparatus, the input/output device and the buffer memory to the respective unit streams. The stream allocator allocates a requested number of the non-used unit streams in accordance with the required speed, when the input/output of a stream is required, and supplies the requested stream in accordance with the schedule of the allocated unit stream.

Japanese Laid Open Patent Application JP-A H10-303932 discloses a communication apparatus including transfer means, judgment means and allocation means. The transfer means transfers communication data to a communication path. The judgment means judges the contents of the transferred communication data. The allocation means allocates the band of the communication path in accordance with the judged contents of the transferred communication data.

FIGS. 1A and 1B are views showing examples of inefficient use of I/O resources in which job #2 requesting an occupation ratio of 75% is submitted when job #1 is executed with an occupation ratio of 66%. In the job scheduling shown in FIG. 1A, the execution of the job #2 is not started until the resource required by the job #2 can be secured, namely, until the completion of the execution of the job #1. In the job scheduling shown in FIG. 1B, on the other hand, the I/O resource is secured with an occupation ratio of 33% and then the job #2 is started, although the required occupation ratio of 75% is not secured. In the example of FIG. 1A, the job #2 is awaited until the completion of the execution of the job #1, although 33% of the I/O resource is available. In the example of FIG. 1B, on the other hand, there is a problem that a potentially-available resource is not used after the completion of the job #1, although the execution of the job #2 is started with an occupation ratio of 33%, which can be secured at the start of the job #2.

SUMMARY

Therefore, an object of the present invention is to provide a computer system designed to provide accesses to a file system for compute nodes through I/O nodes, wherein I/O nodes are dynamically allocated to jobs so as to prevent the executions of the jobs from being resumed and thereby achieving efficient use of the I/O resources.

In an aspect of the present invention, a computer system is provided with a file system storing data; a plurality of I/O nodes which are adapted to access the file system; a compute node adapted to execute a job and to issue an I/O request when requiring an I/O operation; and a job server for job scheduling which dynamically allocates an I/O resource of the I/O nodes to a job without stopping execution of the job. The job server includes an I/O node scheduler adapted to, when being not able to fully secure an desired amount of the I/O resource of the I/O nodes required by the job in starting the job, secure a part of the required amount of the I/O resource of the I/O nodes, and to allocate the secured part of the I/O resource to the job.

In another aspect of the present invention, a method for I/O node control is provided with securing a part of a required amount of I/O resource of I/O nodes for a job in starting the job; allocating the secured part of the required amount of the I/O resource of I/O nodes to the job; releasing an I/O resource of the I/O nodes which have been used by an other job upon completion of the other job; and dynamically allocating the released I/O resource to the job for I/O resource shortage from the required amount of the I/O resource of the I/O nodes, without stopping execution of the job.

BRIEF DESCRIPTION OF THE DRAWINGS

The above and other advantages and features of the present invention will be more apparent from the following description taken in conjunction with the accompanied drawings, in which:

FIG. 1A is a view showing an example of inefficient use of an I/O resource;

FIG. 1B is a view showing another example of inefficient use of an I/O resource;

FIG. 1C is a view showing an example of efficient use an I/O resource achieved in one embodiment of the present invention;

FIG. 2 is a block diagram showing an exemplary configuration a parallel computer system in one embodiment of the present invention;

FIG. 4 is a view schematically showing an exemplary occupation state of I/O nodes;

FIG. 5 shows exemplary contents of an I/O node management table;

FIG. 6 shows exemplary contents of a job management table;

EXEMPLARY EMBODIMENTS

Figure 3A:
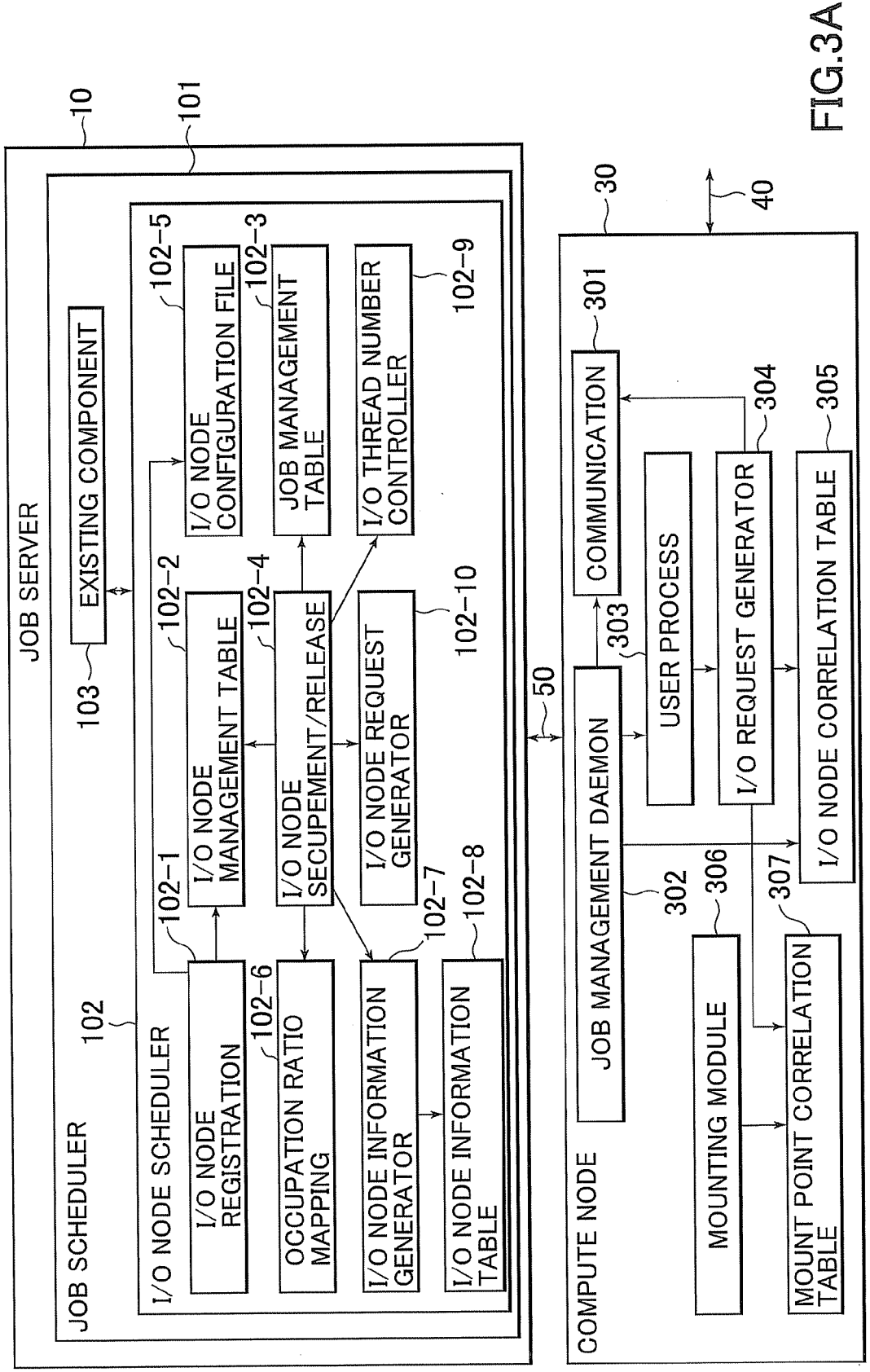
FIGS. 3A and 3B are detailed configuration views of the parallel computer system shown in FIG. 2.

The invention will be now described herein with reference to illustrative embodiments. Those skilled in the art would recognize that many alternative embodiments can be accomplished using the teachings of the present invention and that the invention is not limited to the embodiments illustrated for explanatory purposed.

(Overall System Configuration)

FIG. 2 shows an exemplary configuration of a parallel computer system in one embodiment of the present invention. The parallel computer system shown in FIG. 2, denoted by the numeral 70, is provided with a plurality of I/O nodes 20-1 to 20-*m* connected to a file system 60; a plurality of compute nodes 30-1 to 30-*n* connected to a control network 50; a mutual connection network 40 which provides connections between the I/O nodes 20-1 to 20-*m* and the compute nodes 30-1 to 30-*n;* and a job server 10 for controlling submitted jobs. Any kind of file system including a parallel file system may be used as the file system 60. The parallel computer system 70 controls the I/O nodes 20-1 to 20-*m* to achieve I/O resource allocation adapted to parallel inputs and outputs.

In the parallel computer system 70, any compute node can communicate with all the I/O nodes 20-1 to 20-*m*; any compute node can access the same file system 60 through any I/O node. This implies that a communication can be established between any compute node and any I/O node. The parallel computer system 70 is designed so that any I/O node available at the start of the execution of a job can be allocated to the compute node executing the job.

The parallel computer system 70 dynamically allocates one or more of the I/O nodes 20-1 to 20-m to respective jobs. The dynamic allocation may be achieved on the basis of the user's declaration given at the submission of each job to indicate the necessary I/O resource (specifically, the number of I/O nodes and/or the occupation ratios of the I/O nodes) or on the estimation of the amount of the necessary I/O resources from the number of the compute nodes used by each job and the memory amount secured by each job. In this embodiment, an I/O node scheduler called from a job scheduler allocates the respective occupation ratios of the I/O nodes to be used by each job.

When the requested number of the I/O nodes and/or the requested occupation ratios are not successfully secured due to the use of the I/O nodes by other jobs, the requested values are once decreased to the values at which the occupation ratios can be secured. Then, the execution of the job of interest is started. When the completion of another job consequently makes one or more I/O nodes available, the requested occupation ratio is increased to the originally-required value without resuming the jobs currently being executed.

In this specification, the term "I/O node" means a computer which is able to operate as a client of a client/server-based file system, such as a network file system. The parallel computer system shown in FIG. 2 is structured so that a compute node transfers an I/O request to an I/O node to ask the I/O node to perform an actual I/O operation.

The parallel computer system of this embodiment is based on a technical idea in which the I/O nodes 20-1 to 20-m shown in FIG. 2 are regarded as I/O resources. In this system, a certain job may require only one I/O node while requiring multiple compute nodes. On the other hand, another job may require I/O nodes, the number of which is equal to the number of the requested compute nodes. That is, the necessary I/O resource amount is considered as originally being dependent on the job.

In some cases, a job is not unable to be started until a requested number of compute nodes and a requested amount of memory capacity become available. As for the I/O nodes 20-1 to 20-m, which are regarded as the I/O resources in this embodiment, on the other hand, a job can be actually started even in a case when all the required I/O resources cannot be secured at the time of starting the job; the execution of such job is not always impossible, although this may result in extension of the execution time of the job. In this embodiment, the job scheduler carries out job scheduling in which the execution of a job is started, even if a required amount of the I/O resources cannot be secured. After the job is started, an additional I/O resource is dynamically allocated to the currently-executed job, which has been suffering from the shortage of the I/O resources to increase the amount of the I/O resources to the required value, when I/O resources become available.

(Detailed System Configuration)

Figure 3B:
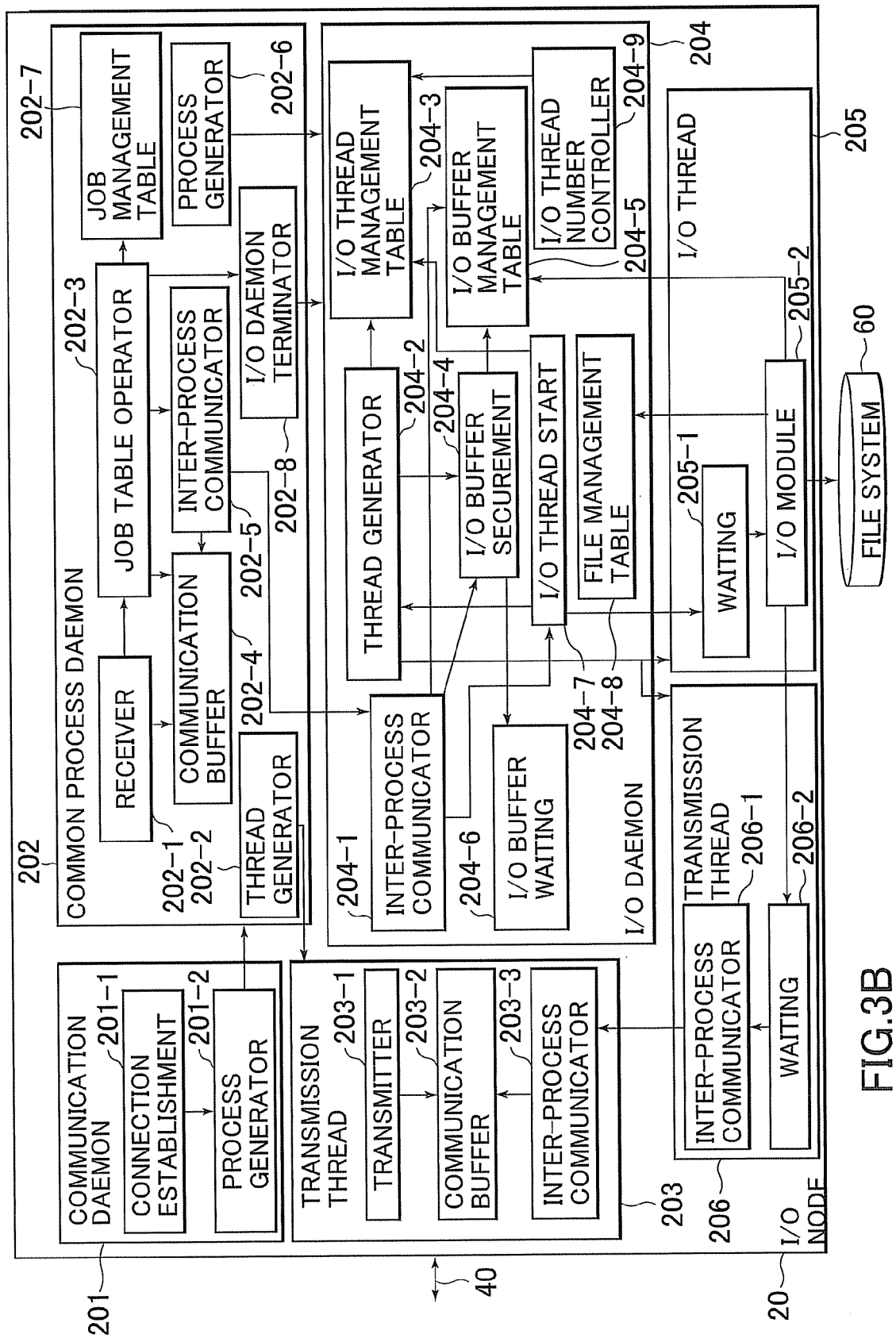

FIGS. 3A and 3B show details of the configuration of the computer system of this embodiment. As shown in FIG. 3A, the job server 10 and the compute nodes 30 are connected through the control network 50, and the compute nodes 30 and the I/O nodes 20 are connected through the mutual connection network 40 as shown in FIGS. 3A and 3B. Although FIG. 3A shows only one compute node 30, the skilled person in the art would appreciate that multiple compute nodes 30 are provided for the parallel computer system of this embodiment.

Similarly, although only one I/O node 20 is shown in FIG. 3B, the person skilled in the art would appreciate that multiple I/O nodes 30 are provided. In the following, a detailed description is given of respective function blocks within the system with reference to FIGS. 3A and 3B.

As shown in FIG. 3A, the job server 10 of this embodiment is provided with a job scheduler 101. The job server 10 controls jobs submitted by the user. In this embodiment, an I/O node scheduler 102 called from the job scheduler 101 is executed on the job server 10. The job server 10 is communicatable with the respective compute nodes 30 through the control network 50. The job scheduler 101 incorporates the I/O node scheduler 102 in addition to an existing component 103 which provides usual job scheduling. The I/O node scheduler 102 is called from the job scheduler 101 and carries out processes related to the dynamic allocation and release of the I/O nodes 20 for each job.

The I/O node scheduler 102 is provided with an I/O node registration module 102-1, an I/O node management table 102-2, a job management table 102-3, an I/O node securement/release module 102-4, an I/O node configuration file 102-5, an occupation ratio mapping module 102-6, an I/O node information generator 102-7, an I/O node information table 102-8, an I/O thread number controller 102-9 and an I/O node request generator 102-10.

The I/O node registration module 102-1 reads out the I/O node ID number, the allowed maximum number of the I/O threads and the IP address of each I/O node from the I/O node configuration file 102-5 and registers them into the I/O node management table 102-2.

The I/O node management table 102-2, which is prepared by the I/O node registration module 102-1, describes the occupation ratios of the respective I/O nodes 20. The occupation ratios described in the I/O node management table 102-2 are updated when the I/O node securement/release module 102-4 secures and releases the I/O nodes.

The job management table 102-3 describes I/O nodes secured by respective jobs, the occupation ratios of the I/O nodes, and the correlation between the compute nodes and the I/O nodes. Also, when the requested occupation ratio cannot be secured for a certain job, the amount of the occupation ratio shortage is recorded in an entry prepared for indicating the occupation ratio shortage. When the completion of another job allows a desired amount of the I/O resources to be secured, the entry indicating the occupation ratio shortage and the entry indicating the job start time are referred. The occupation ratio shortage and the job start time are used to determine a job to which the released I/O resource is to be allocated. The job management table 102-3 is operated by the I/O node securement/release module 102-4.

The I/O node securement/release module 102-4 carries out the following processes upon the start of a job: selection of the requested number of I/O nodes required by respective jobs with desired occupation ratios; and the decrease in the requested occupation ratios when the occupation ratios cannot be secured. In addition, when a job is completed, I/O node securement/release module 102-4 releases the occupation ratio(s) of the I/O node(s) used by the completed job. When a certain job suffers from shortage of the occupation ratio of the I/O node, the I/O node securement/release module 102-4 also allocates the released occupation ratio to the certain job. In the above-described processes, the I/O node management table 102-2 and the job management table 102-3 are referred and updated.

The I/O node configuration file 102-5 describes the I/O node ID number, the allowed maximum number of the I/O threads, and the IP address of each I/O node. The data of the I/O node configuration file 102-5 are held in a file system prepared on a disc drive (not shown) which is directly connected to the job server 10. The I/O node configuration file 102-5 is prepared and modified when a system administrator sets up the respective I/O nodes. Also, the data recorded on the I/O node configuration file 102-5 are read by the I/O node registration module 102-1 and reflected in the I/O node management table 102-2, when the job server 10 is started.

The occupation ratio mapping module 102-6 calculates a job maximum I/O thread number, which is defined as the maximum number of I/O threads used for executing each job, from the required occupation ratios and the allowed maximum number of the I/O threads of respective I/O nodes. The job maximum I/O thread number for a certain job is calculated for each I/O node and defined as the product of the occupation ratio and the allowed maximum number of the I/O threads within the associated I/O node.

The I/O node information generator 102-7 is used to prepare the I/O node information for each compute node after the securement of the necessary I/O nodes. In detail, the I/O node information generator 102-7 secures a region for storing the I/O node information table 102-8 for the compute nodes used in the job of interest on a memory. In addition, the I/O node information generator 102-7 records for each compute node the I/O node ID number of the I/O node corresponding to the each compute node and the IP address of the corresponding I/O node, for each job registered in the job management table 102-3.

The I/O node information table 102-8 is prepared by the I/O node information generator 102-7. The I/O node information table 102-8 describes information of the corresponding I/O node for each compute node. The I/O node information table 102-8 is temporarily generated when a job is started.

The I/O thread number controller 102-9 generates I/O thread number control information. When a certain job is completed and the relevant I/O node is released under a situation that one or more other jobs do not successfully secure a required occupation ratio, the I/O thread number controller 102-9 allocates the released occupation ratio to one or more other jobs which require an additional occupation ratio on the basis of the elapse time from the job start time and the occupation ratio shortage. Then, the I/O thread number controller 102-9 generates I/O thread number control information based on this allocation and transmits the generated control information to the compute node to which the I/O node is additionally allocated.

The I/O node request generator 102-10 receives I/O node request information from the job scheduler 101, and estimates the I/O resource amount required by the job of interest to determine the number of the I/O nodes and the occupation ratio of each I/O node to be allocated to the job of interest, when the number of the I/O nodes to be used for executing the job of interest is not indicated by the user. It should be noted that the I/O node request information is forwarded from the job scheduler 101 to the I/O node scheduler 102 when the job scheduler 101 calls the I/O node scheduler 102. Upon receiving the I/O node request information, the I/O node request generator 102-10 refers to the I/O node request information.

The existing component 103 provides a commonly-used job scheduling function. For example, the existing component 103 provides: a resource management function, such as allocation of the compute nodes and the CPUs, resource management of the use quantities of the memories and CPUs; a job control function, such as job priority control, check point control to resume a currently-executed job at a desired step and to record the contents of the memory used by the job in a file, and restart control to restart the execution of the job based on the file from the step at which the job is resumed; and a communication function to communicate with the compute nodes.

As shown in FIG. 3B, the I/O nodes 20 of this embodiment are each provided with a communication daemon 201, a common process daemon 202, and I/O daemons 204.

The communication daemon 201 establishes a connection with a compute node when the connection is requested by the compute node. One communication daemon 201 is provided for each I/O node 20. When the connection to the compute node which transmits the connection request is established, the communication daemon 201 generates one common process daemon 202, and the subsequent communication with the compute node is carried out by the generated common process daemon 202.

The common process daemon 202 is generated by the communication daemon 201 for each connection request from the compute node. The common process daemon 202 receives packets from the compute node, forwards the received packets to the I/O daemon 204.

The common process daemon transmission thread 203 is generated by the common process daemon 202. The common process daemon transmission thread 203 operates independently of the common process daemon 202. It should be noted that the common process daemon transmission thread 203 may share the memory with the common process daemon 202 in the operations thereof. The common process daemon transmission thread 203 is used to return execution results of the I/O processes to the compute nodes.

The I/O daemons 204 are designed to generate I/O threads 205 (one shown in FIG. 3B) to manage I/O buffers, and to generate an I/O daemon transmission thread 206. In one embodiment, the I/O daemons 204 generate a plurality of I/O threads 207 and one I/O daemon transmission thread 206. One I/O daemon 204 is generated for each job.

The I/O threads 205 are entities which actually execute I/O operations requested by the compute nodes. When one I/O buffer for which an I/O waiting flag is set is selected, the I/O destination is determined in response to the contents of the selected I/O buffer. The I/O threads 205 are generated by the I/O daemon 204, and the I/O threads 205 are able to operate independently of the I/O daemon 204. It should be noted, however, the I/O threads 205 may share the memory with the I/O daemon 204. Also, the number of the generated I/O threads 205 is allowed to be increased up to the allowed maximum job I/O thread number for each job.

The I/O daemon transmission thread 206 retrieve one I/O request from the I/O buffer after the completion of each I/O operation and transmits the retrieved I/O request to the common process daemon transmission thread 203.

The communication daemon 201 is provided with a connection establishment module 201-1 and a process generator 201-2. The connection establishment module 201-1 is a primitive module used for the connection establishment of the communication daemon 201. The process generator 201-2 is used to generate the common process daemon 202. The process generator 201-2 uses a system call to generate a process provided by the operating system.

The common process daemon 202 is provided with a receiver module 202-1, a thread generator 202-2, a job table operator 202-3, a communication buffer 202-4, an inter-process communicator 202-5, a process generator 202-6, a job management table 202-7 and an I/O daemon terminator 202-8.

The receiver module 202-1 is a primitive module which receives or awaits packets transmitted from the compute nodes in response to sockets issued upon the establishment of the communications to the compute nodes.

The thread generator 202-2 generates the common process daemon transmission thread 203. The thread generator 202-2 uses a commonly available thread library, such as a POSIX (Portable Operating System Interface) thread, for generating the common process daemon transmission thread 203.

The job table operator 202-3 registers a process ID (hereafter, referred to as the "PID") of the generated I/O daemon 204 into the entry of the corresponding job ID (hereafter, referred to as the "JID") of the job management table 202-7. When identifying the I/O daemon 204 to which a reception packet is transmitted, the job table operator 202-3 searches the job management table 202-7 with the JID used as a key.

The communication buffer 202-4 stores packets transmitted by the compute nodes. The communication buffer 202-4 is also used to transmit packets to the I/O daemon 204.

The inter-process communicator 202-5 is used to forward an I/O request from the common process daemon 202 to the I/O daemon 204. The inter-process communicator 202-5 is a primitive module used for communications between the processes within the node.

The process generator 202-6 is used to generate the I/O daemon 204, when the common process daemon 202 receives initialization data from a compute node in starting a job. The process generator 202-6 uses a system call to generate a process provided by the operating system.

The job management table 202-7 describes the correlation between the I/O daemons 204 with the jobs; the job management table 202-7 records the JIDs of the jobs and the corresponding PIDs of the I/O daemons 204, in order to correlate the I/O daemons 204 to the jobs.

The I/O daemon terminator 202-8 transmits a completion signal to the I/O daemon 204 corresponding to the job of interest, when the receiver module 202-1 receives the completion report of the job from the compute node for completing the job.

The common process daemon transmission thread 203 is provided with a transmitter module 203-1, a communication buffer 203-2 and an inter-process communicator 203-3. The transmitter module 203-1 is a primitive module which transmits packets to the compute nodes by using sockets issued upon the establishment of the communications to the compute nodes. The communication buffer 203-2 receives packets from the I/O daemon transmission thread 206 and forwards packets to the compute nodes. The inter-process communicator 203-3 is used to receive data transmitted by the I/O daemon transmission thread 206. The inter-process communicator 203-3 is a primitive module used for communications between the processes within the node.

The I/O daemon 204 is provided with an inter-process communicator 204-1, a thread generator 204-2, an I/O thread management table 204-3, an I/O buffer securement module 204-4, an I/O buffer management table 204-5, an I/O buffer waiting module 204-6, an II/O thread start module 204-7, a file management table 204-8 and an I/O thread number controller 204-9.

The inter-process communicator 204-1 receives packets, such as I/O requests received by the common process daemon 202 from the compute nodes. The inter-process communicator 204-1 is a primitive module used for communications between processes within the node.

The thread generator 204-2 generates the I/O threads 205 and the I/O daemon transmission thread 206. In this embodiment, a commonly-used thread library, such as a POSIX thread, is used to generate the I/O threads 205 and the I/O daemon transmission thread 206.

The I/O thread management table 204-3 manages the job maximum I/O thread number, the number of the generated I/O threads, and the number of the I/O threads on which an I/O operation is currently performed. The I/O thread management table 204-3 uses I/O in-execution flags to indicate currently-used threads.

The I/O buffer securement module 204-4 is used as: a buffer for receiving packets, such as I/O requests, transmitted from the common process daemon 202; and a buffer used for the I/O threads 205 to perform I/O operations. The I/O buffer securement module 204-4 is used as a common buffer for the operations from the completion of the I/O process to the transmission of packets from the I/O daemon transmission thread 206 to the common process daemon transmission thread 203. This eliminates the needs for copying data between the memories.

The I/O buffer management table 204-5 is used to manage the I/O buffers. The I/O buffer management table 204-5 uses reception waiting flags, I/O waiting flags, I/O in-execution flags and return wait flags to indicate the current state of the I/O buffers.

The I/O buffer waiting module 204-6 provides a waiting function. The I/O buffer securement module 204-4 may be unable to provide a requested memory capacity in the I/O buffers under a situation that the I/O buffers are already used up to the usable upper value. In this case, the I/O buffer waiting module 204-6 places the I/O thread 205 into the waiting state until another I/O buffer become available.

The I/O thread start module 204-7 examines whether there is an available I/O thread on the basis of the contents of the I/O thread management table 204-3. When there are one or more available I/O threads, one unused I/O thread (for which the corresponding I/O in-execution flag is not set) is selected from the I/O thread management table 204-3, and the corresponding I/O in-execution flag is set.

The file management table 204-8 correlates files opened on the compute nodes and files on the file system 60 which each I/O node mounts. The file management table 204-8 describes an association of the IP addresses of the compute nodes, the PIDs of the processes requesting I/O operations, file descriptors (hereafter, referred to as FDs) with the FDs on the I/O nodes.

The I/O thread number controller 204-9 updates the I/O thread management table 204-3 to increase the job maximum I/O thread number described in the I/O thread management table 204-3 by the "increase amount of the job maximum I/O thread number" described in I/O thread number control information within a packet received from the job server 10 through a compute node, for the job which requires an increase in the occupation ratio of an I/O resource. In addition, the I/O thread number controller 204-9 searches the I/O buffer management table 204-5 to examine whether there is a buffer for which the I/O waiting flag is set.

The I/O threads 205 are each provided with a waiting module 205-1 and an I/O module 205-2.

The waiting module 205-1 places an I/O thread 205 into the waiting state until receiving an I/O request from a compute node. On receipt of an I/O request, the I/O daemon 204 is restarted by the I/O thread start module 204-7. The waiting module 205-1 allows restarting an I/O thread 205 that waits for an I/O request, when the I/O daemon 204 selects the I/O thread which is not currently used and sets the corresponding I/O in-execution flag.

The I/O module 205-2 performs system calls, such as open, read, and write operations, on the file system 60 which an I/O node mounts in response to an I/O request from a compute node. When the execution of a system call is completed, the I/O module 205-2 stores execution results in the corresponding I/O buffer, and allows re-execution of the I/O daemon transmission thread 206.

The I/O daemon transmission thread 206 is provided with an inter-process communicator 206-1 and a waiting module 206-2.

The inter-process communicator 206-1 transmits to the common process daemon transmission thread 203 data stored in the I/O buffer for which an I/O process is completed. The inter-process communicator 206-1 is a primitive module which provides inter-process communication within the node.

The waiting module 206-2 places the I/O daemon transmission thread 206 into the waiting state until the re-execution from the I/O thread 205 after the completion of the I/O process.

As shown in FIG. 3A, the compute nodes 30 (one shown) of this embodiment are each provided with a communication module 301, a job management daemon 302, user processes 303 (one shown), an I/O request generator 304, an I/O node correlation table 305, a mounting module 306 and a mount point correlation table 307.

The communication module 301 communicates with the job server 10 and the I/O nodes 20.

The job management daemon 302 accommodates communications with the job scheduler 101 and controls the start of the jobs in the compute nodes 30.

The user processes 303 execute user application programs. The user processes 303 each belongs to a particular job started by the job server 10. If necessary, the user processes 303 request an I/O operation for the corresponding I/O node by issuing a system call.

The I/O request generator 304 generates a request for transmitting a read/write request or a file system operation request to the corresponding I/O node, when the user processes 303 carry out read/write operations from or to the file system 60 which the relevant I/O node mounts or performs other operations on other files or file systems.

The I/O node correlation table 305 describes the I/O nodes allocated to the respective compute nodes 30. In detail, the I/O node correlation table 305 describes the IP addresses of the corresponding I/O node and sockets used for communication for each job.

The mounting module 306 records the correlation between path names of mount points defined in the instant compute node 30 and path names of mount names defined in the I/O nodes 20 in the mount point correlation table 307. When a user process 303 on the compute node 30 calls a system call specifying the path name of a file or directory, such as open instructions, it is necessary to convert the path name of the file or directory defined in the compute node 30 into the path name defined in the relevant I/O node. To address this requirement, the mounting module 306 records the correspondence between: the path names of the mount points defined in the compute node 30 specified by a mount command and the path names of the mount points defined in the I/O node 20 onto the mount point correlation table 307.

The mount point correlation table 307 describes the correlation between path names of mount points defined in the compute nodes 30 and path names of mount names defined in the I/O nodes 20 in the mount point correlation table 307.

The mutual connection network 40 shown in FIGS. 3A and 3B is used to exchange data and messages between the compute nodes 30 and to communicate I/O data and control data for I/O operations between the compute nodes 30 and the I/O nodes 20, in executing a job in which the plurality of compute nodes 30 are used to carry out a parallel process. It would be advantageous if the mutual connection network 40 is designed to provide high-speed communication between the compute nodes 30 or between the compute nodes 30 and I/O nodes 20. It should be noted, however, that a commonly available network, such as an Ethernet network and an InfiniBand network, may be used as the mutual connection network 40.

The control network 50 shown in FIG. 3A provides communications between the job server 10 and the compute nodes 30, when a job is started or completed. A commonly-available network, such as an Ethernet network, may be used as the control network 50.

The file system 60 shown in FIG. 3B is accessible from the I/O nodes 20. The file system 60 may be a parallel file system, a network file system, or a cluster file system, which provides a generally known interface, such as POSIX. The file system 60 is mounted for the respective I/O nodes by the system administrator as a mount point identified by the same path name, when the I/O nodes are booted. It should be noted that, when a plurality of file systems are mounted, different path names of the mount points are defined for the mounted file systems. To meet this requirement, the file systems are mounted onto the respective I/O nodes with the same path name.

FIG. 4 is a diagram showing one example of the occupation situation of the I/O nodes for a case when the number of the I/O nodes 20 is four. In the example shown in FIG. 4, job #1 secures I/O nodes #1 to #4 with an occupation ratio of 25%, and job #2 secures I/O nodes #1 and #2 with an occupation ratio of 35%. On the other hand, job #3 secures I/O nodes #3 and #4 with an occupation ratio of 20%, and job #4 secures I/O node #3 with an occupation ratio of 25%. Finally, job #5 secures I/O node #4 with an occupation ratio of 15%, and job #6 secures I/O nodes #1 to #4 with an occupation ratio of 15%.

FIG. 5 shows exemplary contents of the I/O node management table 102-2 incorporated within the I/O node scheduler 102 of the job server 10. The I/O node management table 102-2 holds data describing the occupation ratios of the respective I/O nodes (also see FIG. 4). As shown in FIG. 5, the I/O node management table 102-2 includes entries of the I/O node ID numbers, the used percentages of the respective I/O nodes (the total of the allocated occupation ratios), the allowed maximum I/O thread numbers, and the IP addresses.

FIG. 6 shows exemplary contents of the job management table 102-3 incorporated within the I/O node scheduler 102 of the job server 10. The job management table 102-3 includes entries of job ID numbers, compute node ID numbers, I/O node ID numbers, occupation ratios, occupation ratio shortages, and job start times.

Figure 7:
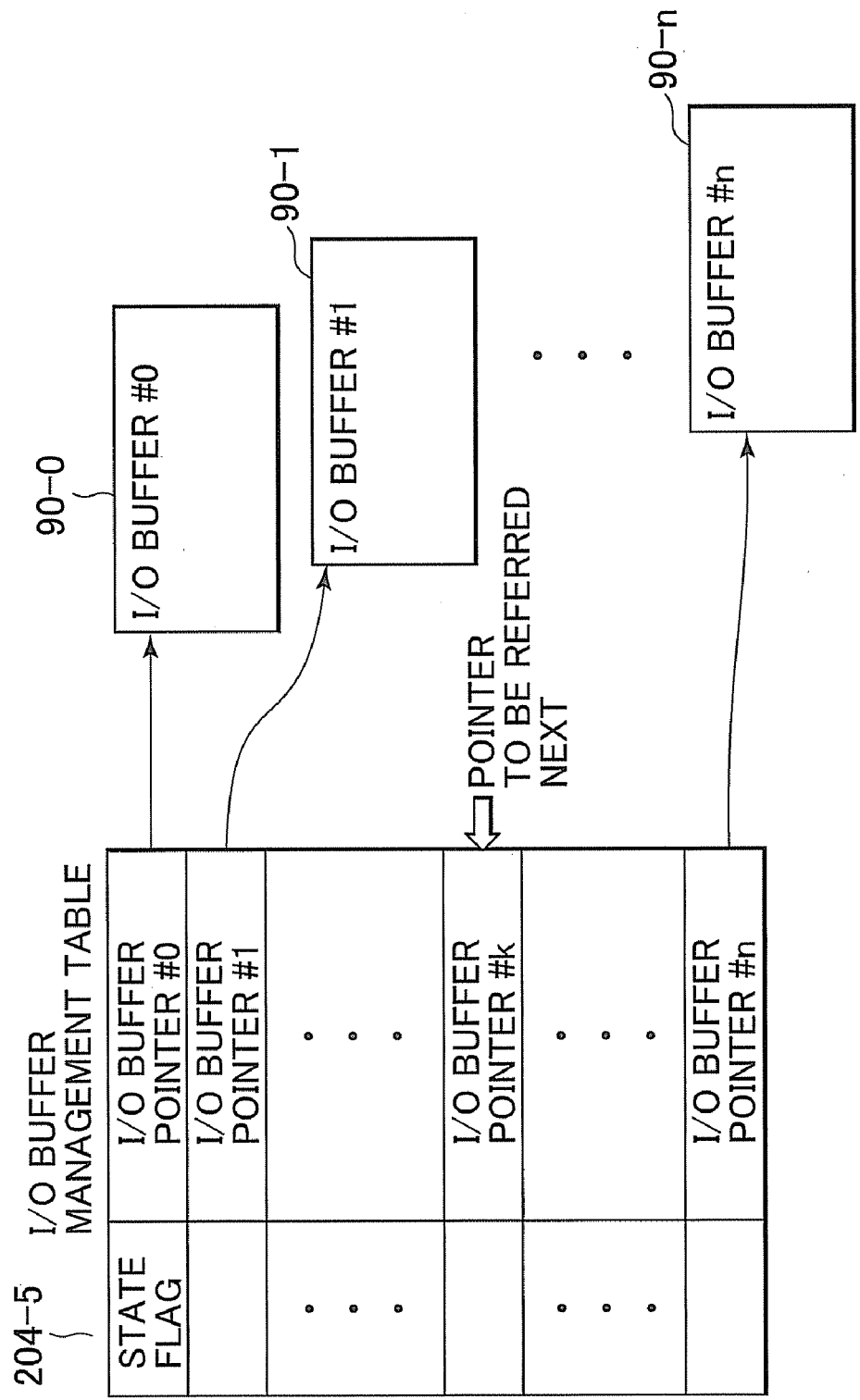
FIG. 7 shows exemplary contents of an I/O buffer management table.

FIG. 7 shows exemplary contents of the I/O buffer management table 204-5 within the I/O daemon 204 of each I/O node 20. As shown in FIG. 7, the I/O buffer management table 204-5 includes entries of the flags indicating the states and pointers identifying the I/O buffers. The pointers #0 to #n stored in the I/O buffer management table 204-5 respectively indicate the places of I/O buffers #0 to #n, which may be denoted by the numerals 90-0 to 90-*n*, respectively.

In this embodiment, the necessary number of the I/O nodes and the occupation ratios thereof are estimated from the number of the compute nodes used for a job of interest and the secured memory capacity. It should be noted that, especially for a job that requires parallel I/O operations, the user who submits the job of interest may declare the number of the I/O nodes and the occupation ratio of the respective I/O nodes, as the I/O resources necessary for the job, in submitting the job.

Thus, the number of the I/O nodes may be identified in accordance with the parallel degree of the job requesting parallel I/O operations.

The I/O node scheduler 102 within the job server 10 contains management data with regard to the occupation ratios of the respective I/O nodes 20 in the I/O node management table 102-2 and data information with regard to the I/O nodes allocated to the respective jobs in the job management table 102-3. In accordance with these data, the I/O node scheduler 102 determines the used percentages of the respective I/O nodes (the total of the allocated occupation ratios) and sequentially selects the I/O nodes in the order starting with the I/O node of the lowest used percentage to allocate the number of the I/O nodes requested by a newly submitted job.

In some cases, however, the required number of the I/O nodes and occupation ratios thereof may be unable to be secured, due to the use of the I/O nodes by other jobs. In this case, the required values are once decreased to the values at which the occupation ratios of the I/O nodes can be secured, and then the execution of the job of interest is started. When a certain I/O node becomes available due to the completion of a certain job, a dynamic control for increasing the occupation ratio to the originally required value is carried out without stopping the currently-executed jobs.

Schematically, the following processes are implemented within each I/O node: An I/O daemon is generated for each job within the I/O node. The generated I/O daemon then generates an I/O thread(s) for actually executing I/O processes. At this time, the allowed maximum number of I/O threads within each I/O node is given as a fixed value. The I/O daemon is allowed to generate a number of I/O threads which number is determined proportionally to the occupation ratio of each I/O node for each job on the basis of the allowed maximum number of the I/O threads. This allows the job of interest to issue a number of I/O requests which number is proportional to the occupation ratios set by the I/O node scheduler.

As a result, the I/O resource necessary for each job can be dynamically allocated when a plurality of jobs are executed at the same time. Also, even when many I/O operations are required, the number of I/O requests simultaneously issued by a certain I/O node is limited to the allowed maximum number of the I/O threads. This avoids the delay in processes potentially caused by the overload of the file system.

(System Operation)

In the following, a detailed description is given of an exemplary operation of the I/O node control in this embodiment with reference to the flowcharts shown in FIGS. 8 and 9. In this embodiment, communications between the job server 10 and the compute nodes 30-1 to 30-n and between the compute nodes 30-1 to 30-n and the I/O nodes 20-1 to 20-m may be achieved by using a commonly-used communication protocol, such as TCP/IP (Transmission Control Protocol/Internet Protocol). In addition, UNIX, Linux or other operating systems may be used in the respective nodes.

I/O Node Registration

When the job server 10 is started, the I/O node scheduler 102 secures the regions for storing the I/O node management table 102-2 and the job management table 102-3 on the memory. In succession, the I/O node registration module 102-1 reads the ID number, the allowed maximum number of I/O threads, and the IP address for each I/O node, from the I/O node configuration file 102-5. This is followed by registering these data into the I/O node management table 102-2. For incorporating an additional I/O node into the system, the system administrator may input the ID number, the allowed maximum number of the I/O threads and the IP address of the I/O node to be incorporated, similarly to the above-described procedure during the system operation.

File System Mounting

In the parallel computer system of this embodiment, the entities which directly access the file system 60 are the I/O nodes 20-1 to 20-m, and the entities which requests I/O operations are the compute nodes 30-1 to 30-n. This necessitates generating data indicative of the correlation between the I/O nodes 20-1 to 20-m which mount the file system 60 and the compute nodes 30-1 to 30-n. In this embodiment, an interface is used which is similar to a network file system, such as an NFS (Network File System), and the system administrator executes a mount command from each compute node as if the respective I/O nodes operate as a server within the network file system,.

In mounting the file system 60, the mounting module 306 registers the correlation between the path name of the mount point on the specified I/O node and the path name of the mount point of the compute node corresponding thereto in the empty entry of the mount point correlation table 307, when the file system type is indicative of the I/O node. It should be noted that the region of the mount point correlation table 307 is secured on the memory when the compute node is started. This operation assumes that the system administrator preliminarily mounts the file system 60 on the I/O node of interest to allow the use of the file system 60 from the I/O node.

Job Start Procedure

In the job server 10, the job scheduler 101 generates I/O node request information to call the I/O node scheduler 102. The I/O node request information includes data indicative of the number of the I/O nodes, the occupation ratios of the respective I/O nodes, the number of the compute nodes, the IP addresses of the respective compute nodes, the required memory capacity, and the actually mounted memory capacity.

Some jobs may be submitted with a user's explicit request for the number of the I/O nodes and the occupation ratios thereof, while others may be submitted without any user's request concerning the number of the I/O nodes and the occupation ratios thereof. For a job accompanied by an explicit request for the number of the I/O nodes and the occupation ratios of the respective I/O nodes, the number of the I/O nodes and the occupation ratios of the respective I/O nodes are determined in accordance with the request.

When no explicit request is accompanied by the job in connection with the number of the I/O nodes and the occupation ratios thereof, the I/O node request information is generated so that the requested number and occupation ratios of the I/O nodes are defined as zero, respectively. The I/O node request information is forwarded to the I/O node scheduler 102, when the job scheduler 101 calls the I/O node scheduler 102. At first, the I/O node request generator 102-10 refers the I/O node request information received from the job scheduler 101, and the following procedure is implemented to estimate the I/O resource amount required by the job and to determine the number of the I/O nodes and the occupation ratios of the respective I/O nodes, when the number of the I/O nodes is indicated as zero.

(1) When the number of available I/O nodes is equal to or more than the number of the compute nodes requested by the job of interest, the number of the compute nodes requested by the job of interest is determined as the requested number of the I/O nodes. When the number of available I/O nodes is less than the number of the compute nodes requested by the job of interest, the requested number of the I/O nodes is determined as the maximum number of the I/O nodes, the integer multiple of which is equal to the number of the compute nodes.

(2) The ratio of the total memory capacity required by the job to the total of the mounted memory capacities of the requested compute nodes is determined. The determined ratio is divided by the number of the I/O nodes determined by the above-described procedure (1). The obtained value is determined to be the occupation ratio of each I/O node.

Next, the I/O node securement/release module 102-4 searches the I/O node management table 102-2 to select the requested number of I/O nodes in the order starting with the I/O node of the lowest used percentage. This is followed by increasing the used percentage of the entries corresponding to the selected I/O nodes by the requested occupation ratio, and an entry for the job of interest is secured in the job management table 102-3. The allocated compute node ID numbers, the I/O node ID numbers corresponding thereto, the secured occupation ratios, and the job start time are then recorded.

For a case when the sum of the required occupation ratio and the used percentage of the selected I/O node exceeds 100% and the current used percentage is not 100%, however, the used percentage described in the I/O node management table 102-2 is updated to 100%, and the securable occupation ratio is recorded in the entry of the occupation ratio of the job management table 102-3, and the occupation ratio that is not secured is recorded in the entry of the occupation ratio shortage. When there is an I/O node in which the current used percentage is 100% and the required number of the I/O nodes cannot be secured, the error indicating this fact is returned to the job scheduler 101.

When the I/O nodes are successfully secured, the I/O node information is then generated for each compute node. At first, the I/O node information generator 102-7 secures the region of the I/O node information table 102-8 corresponding to the number of the compute nodes used by the job on the memory. The corresponding I/O node ID number and the IP address are recorded for each compute node with respect to the job of interest, which is registered in the job management table 102-3.

Next, the occupation ratio mapping module 102-6 calculates the job maximum I/O thread number given to the job on the basis of the occupation ratio and the allowed maximum number of I/O threads of each I/O node described in the I/O node management table 102-2, for each compute node corresponding to the job registered in the job management table 102-3. The I/O node information generator 102-7 then records the calculated job maximum I/O thread number in the I/O node information table 102-8 and returns the job maximum I/O thread number to the job scheduler 101. After the return, the region of the I/O node information table 102-8 is released by the job scheduler 101. Subsequently, the job scheduler 101 transmits data with regard to the job start that includes the above-described I/O node information to each compute node.

Figure 8:
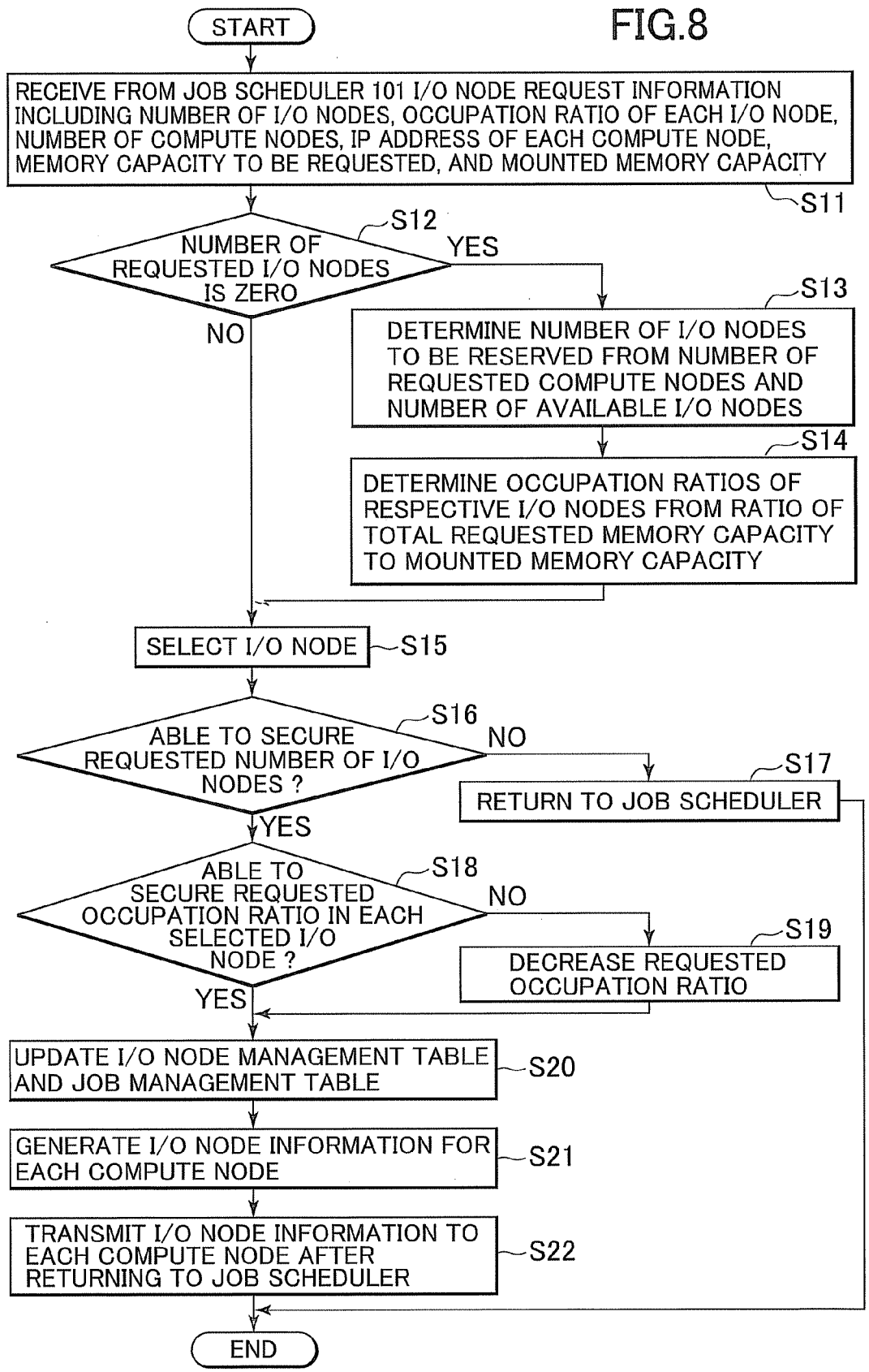
FIG. 8 is a flowchart showing an exemplary operation of an I/O node scheduler when a job is started.

FIG. 8 is the flowchart showing an exemplary operation of the I/O node scheduler 102 when the job is started. At Step S11, the I/O node request information is forwarded to the I/O node scheduler 102. At Step S12, it is determined whether the user explicitly specifies the number of the I/O nodes and the occupation ratios thereof. If the specified number of the I/O nodes is 0, namely, if the user does not explicitly specify the number of the I/O nodes and the occupation ratios thereof, the I/O node request generator 102-10 estimates the necessary I/O resource amount at Steps S13 and S14. The I/O node securement/release module 102-4 then selects the necessary number of the I/O nodes at Step S15, after the I/O node request information is fixed. When the necessary number of the I/O nodes is not determined as being unable to be secured at Step S16, the control procedure returns to the job scheduler 101 at Step S17.

When the necessary number of the I/O nodes can be secured, it is determined whether or not the required occupation ratios can be secured at Step S18. If the required occupation ratios cannot be secured, the occupation ratios to be used are decreased to secure only the securable occupation ratios at Step S19. In succession, the I/O node management table 102-2 and the job management table 102-3 are updated to indicate the secured I/O nodes and occupation ratios thereof at Step S20. The I/O node information is then generated for each compute node at Step S21. After that, the control procedure returns to the job scheduler 101. The job scheduler 101 then transmits data for starting the job, including the I/O node information, to each compute node at Step S22.

When the job management daemon 302 in each relevant compute node receives the packets, which include the information required to start the job from the job scheduler 101, through the communication module 301, the region of the I/O node correlation table 305 is secured on the memory for each job before the user process 303 is started. The I/O node information included in the received packets is then stored in the I/O node correlation table 305 together with the JID of the job.

Next, the job management daemon 302 issues a connection request by using the communication module 301, when the connection to communicate with the corresponding I/O node is not established. The resultant socket generated in response to the connection request is then recorded in the I/O node correlation table 305. When the connection to the I/O node is established, the job management daemon 302 uses the communication module 301 to transmit initialization information including: the user ID, the group ID (hereafter, referred to as UID and GID, respectively), authentication information, such as the complementary group ID, the JID, the job maximum I/O thread number, which is defined as the allowed maximum number of the I/O threads for the job, and the initialization information which includes the identifier indentifying the initialization information to the common process daemon 202 through the mutual connection network 40.

As for the I/O nodes, one communication daemon 201 is prepared in each I/O node. When receiving a connection request from a compute node, the communication daemon 201 generates one common process daemon 202 after the connection is established, and the generated common process daemon 202 generates a communication thread 203 by the thread generator 202-2. Subsequently, the common process daemon 202 secures the regions for the communication buffer 202-4 and the job management table 202-7 on the memory, and the receiver module 202-1 is placed into the reception waiting state from the corresponding compute node. Also, the communication thread 203 secures the region of the communication buffer 203-2 on the memory and is placed into the reception waiting state for the completion report of the I/O operation from the inter-process communicator 203-3.

When the common process daemon 202 receives the initialization information from the corresponding compute node, the process generator 202-6 generates the I/O daemon 204. The PID of the I/O daemon 204 generated by the job table operator 202-3 is registered in the entry of the corresponding JID in the job management table 202-7. The inter-process communicator 202-5 transmits the above-described initialization information to its I/O daemon 204.

The generated I/O daemon 204 secures the regions of the I/O thread management table 204-3, the I/O buffer management table 204-5 and the file management table 204-8 on the memory. The I/O buffer securement module 204-4 secures one I/O buffer with a fixed length and sets a flag for indicating the reception waiting and registers the secured I/O buffer in the I/O buffer management table 204-5. Next, the thread generator 204-2 generates one I/O daemon transmission thread 206. Then, the inter-process communicator 204-1 is placed in the reception waiting state from the common process daemon 202 with the secured buffer prepared for a reception region. In the meantime, the waiting module 206-2 places the generated I/O daemon transmission thread 206 into the waiting state.

Upon receiving the initialization information from the common process daemon 202, the I/O daemon 204 sets the effective user ID, the group ID, the complementary group ID and the like to the same values as those on the user process executed on the compute node, in accordance with the authentication information within the initialization information. This is followed by registering the job maximum I/O thread number, which is defined as allowed maximum number of the I/O threads for the job of interest, into the I/O thread management table 204-3. The inter-process communicator 204-1 is then placed into the reception waiting state from the common process daemon 202.

It should be noted that the common process daemon 202 is one-to-one associated with a certain compute node. When receiving a new connection request from a compute node, the communication daemon 201 establishes the connection to the requesting compute node and newly generates another common process daemon 202.

Job Completing Procedure

When detecting that all the user process 303 are completed, the job management daemon 302 refers to the I/O node correlation table 305 in the compute node. The job management daemon 302 then transmits a packet to report the completion of the job to the corresponding I/O node. In detail, the job management daemon 302 transmits a packet incorporating: a packet identifier indicating that the packet is the job completion report; the compute node ID number; and the JID of the job of interest to the corresponding I/O node through the communication module 301. The completion report of the job is transmitted to the job scheduler 101 in the job server 10.

In the common process daemon 202 on the I/O node, the job table operator 202-3 searches the job management table 202-7 with the JID incorporated within the reception packet used as a key. The common process daemon 202 then specifies the I/O daemon 204 corresponding to the job, and deletes the entry corresponding to the specified I/O daemon 204. The I/O daemon terminator 202-8 then transmits a completion signal to the I/O daemon 204 to terminate the I/O daemon 204, and all of the I/O threads 205 and I/O daemon transmission threads 206 under the administration of the I/O daemon 204. At this time, all of the secured regions of the I/O buffer are released.

When the job server 10 receives the completion report of the job, the I/O node scheduler 102 is called from the job scheduler 101, and the process for releasing the secured I/O node is executed. In this process, the JID of the completed job is also forwarded to the I/O node scheduler 102. In the I/O node scheduler 102, the I/O node securement/release module 102-4 searches the job management table 102-3 with the JID used as a key to identify the corresponding entry. The I/O node securement/release module 102-4 then reads the used I/O node ID numbers and the occupation ratios thereof, and specifies the entries of the relevant I/O nodes from the I/O node management table 102-2. Then, the corresponding entry of the job management table 102-3 is deleted after the used occupation ratio is subtracted from each used percentage described in the I/O node management table 102-2.

Next, the I/O node securement/release module 102-4 searches the job management table 102-3 again to extract the entry in which the I/O node ID number described therein matches the used I/O node ID number and the occupation ratio shortage is not zero. When such an entry is not found, this implies that no job is executed under a situation in which the I/O resource is lacking. Thus, the I/O node scheduler 102 returns the control to the job scheduler 101.

When one or more entries are extracted, the I/O thread number controller 102-9 calculates: the elapse time (this value is referred to as T) from the job start time to the current time; and the ratio of the occupation ratio shortage to the occupation ratio requested at the time of starting the job, (this ratio is referred to as "a") for the extracted entry (entries).

In this calculation, the I/O nodes are selected in the order starting with the I/O node corresponding to the job for which the value obtained as (T×T+a×a) is maximum. Then, the occupation ratio which has been used by the already-completed job is added to the occupation ratio of the job of interest in the job management table 102-3 and subtracted from the occupation ratio shortage. It should be noted that, when the occupation ratio of the job of interest exceeds 100% as the result of adding the occupation ratio which has been used by the already-completed job, the occupation ratio of the job of interest is set 100%. Next, the increase amount of the occupation ratio of the job of interest is added to the used percentage of the I/O node in the I/O node management table 102-2. Then, the occupation ratio mapping module 102-6 calculates the increasable number of the I/O threads. In general, multiple sets of the I/O thread number control information (the job number, the compute node number, the I/O node ID numbers, and the increase amount of the Job maximum I/O thread numbers) are produced at this moment.

It should be noted that the value (T×T+a×a) implies, the square of the distance from the original point when an orthogonal coordinate system of a and T is considered. In short, the selection of the farthest distance from the original point is considered to be reasonable.

This is followed by transmitting the I/O thread number control information incorporating the packet identifier indicating the I/O thread number control information, from the job scheduler 101 to the respective compute nodes. This completes the job completing process in the job server 10.

Figure 9:
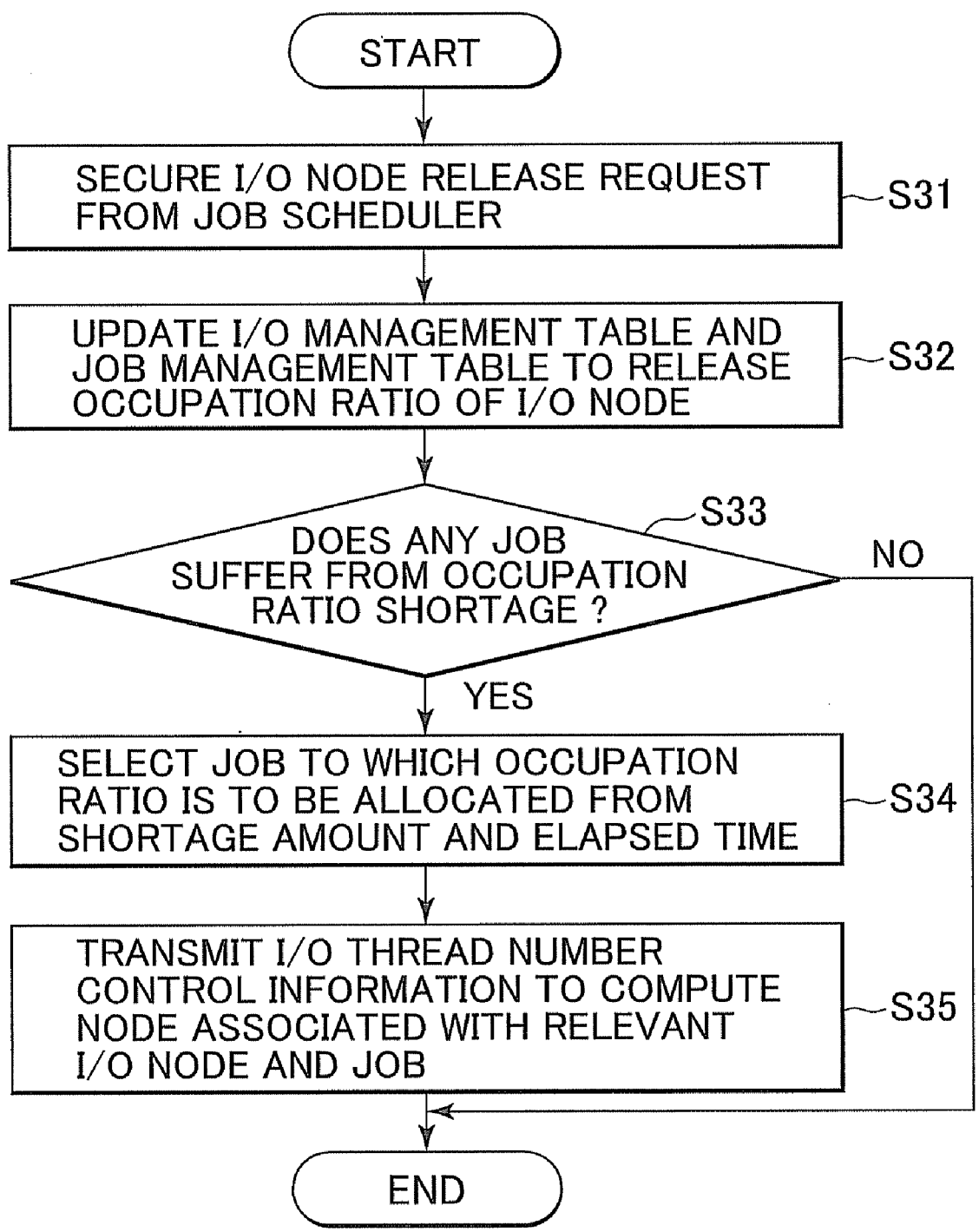
FIG. 9 is a flowchart showing an exemplary operation of the I/O node scheduler when the job is completed.

FIG. 9 is the flowchart showing an exemplary operation of the I/O node scheduler 102 in completing the job. At Step S31, the job scheduler 101 calls the I/O node scheduler 102 in order to ask the I/O node scheduler 102 to release the resource with regard to the I/O node used by the job. At Step S32, the I/O node securement/release module 102-4 of the I/O node scheduler 102 specifies the entry of the job management table 102-3 corresponding to the JID of the job. This is followed by deleting the specified entry of the job management table 102-3 after the used percentage of the I/O node management table 102-2 is updated for the used I/O node. Then, at Step S33, it is judged whether there is a job which suffers from shortage of the occupation ratio among other operating jobs. When there is no job which suffers from the shortage of the occupation ratio, the control procedure returns to the job scheduler 101. When any job suffers from the shortage of the occupation ratio, the job to which the occupation ratio released at Step S34 is to be allocated is determined. At Step S35, the I/O thread number control information is transmitted to the corresponding compute node.

When the job management daemon 302 within the compute node receives a packet through the communication module 301, the job management daemon 302 judges whether the packet incorporates the I/O thread number control information on the basis of the packet identifier. When the received packet incorporates the I/O thread number control information, the job management daemon 302 forwards the I/O thread number control information as it is to the common process daemon 202 in the targeted I/O node through the communication module 301.

On the I/O node of interest, the common process daemon 202 which receives the packet through the receiver module 202-1 refers to the JID within the communication buffer 202-4 that stores the data of the received packet. The job table operator 202-3 searches the job management table 202-7 with the JID used as a key, and identifies the corresponding I/O daemon 204. Then, the received packet is transmitted by the inter-process communicator 202-5 to the I/O daemon 204.

When the I/O daemon 204 receives the packet from the common process daemon 202 by using the inter-process communicator 204-1, the reception waiting flag is reset for the entry of the I/O buffer management table 204-5 corresponding to the buffer storing the received packet. When the packet identifier indicates that the received packet incorporates the I/O thread number control information, the I/O thread number control module 204-9 increases the job maximum I/O thread number described in the I/O thread management table 204-3 by the "increase amount of the job maximum I/O thread number" indicated in the I/O thread number control information incorporated within the received packet.

The I/O daemon 204 then searches the I/O buffer management table 204-5 to determine whether or not there is a buffer for which the I/O waiting flag is set. When there is at least one buffer for which the I/O waiting flag is set, the thread generator 204-2 generates one or more new threads the number of which is equal to the number of the buffer(s) for which the I/O waiting flag is set, under the condition that the number of I/O threads for the job of interest does not exceed the job maximum I/O thread number. The operation of the newly-generated I/O thread(s) 205 is similar to the operation in executing the I/O operation.

I/O Operation

In the following, a description is given of the process executed on the compute node, when an I/O request is issued from a system call related to an I/O operation, such as open, read, write, and close operations, from a user process 303 used to execute the job.

When the system call called by the user process 303 is directed to a read or write operation, the size of data that can be transferred to the I/O node at one time (hereafter, referred to as a transfer size) is compared with a user-requested I/O size that is given as the argument of the read/write system call. When the user-requested I/O size is larger, a set of I/O operations are sequentially implemented with the I/O size of each I/O operation defined as the transfer size.

First, the packet identifier is stored, which indicates: the file descriptor (hereafter, referred to as FD) or the path name of a file or directory of the file held on the compute node by the I/O request generator 304; the path name of the current directory; the PID of the process calling the system call; the IP address of the compute node; the JID of the job to which the user process belongs; and the authentication information (including the user ID, the group ID, the complementary group ID and the like). For a read/write operation, the packet identifier is accompanied by the I/O size, the current file offset, and the kind of the system call (open, read, write or other operation).

For the write operation, a series of data with a length corresponding to the I/O size are read from the address of the memory at which write data are stored and added to the end of the packet. In this process, the path names of the file and the directory and the path name of the current directory are required to be retrieved from the mount point correlation table 307 and converted into the full path name from the route file system in the I/O node which corresponds to the path name on the compute node.

This is followed by specifying the socket of the I/O node corresponding to the job with reference to the I/O node correlation table 305, and then transmitting the packet.

The common process daemon 202 in the I/O node receives the packet by using the receiver module 202-1. The common process daemon 202 refers to the JID described in the communication buffer 202-4 that stores the data of the received packet. The job table operator 202-3 then searches the job management table 202-7 with the JID used as the key, and specifies the corresponding I/O daemon 204. In succession, the received packet is transmitted to the I/O daemon 204 by the inter-process communicator 202-5.

When the I/O daemon 204 receives the packet from the common process daemon 202 by using the inter-process communicator 204-1, the I/O waiting flag is set and the reception wait flag is reset, for the entry of the I/O buffer management table 204-5 that corresponds to the buffer storing the received packet. Then, the I/O thread start module 204-7 registers the job maximum I/O thread number, which is the allowed maximum number of the I/O threads for each job, described within the received packet, in the I/O thread management table 204-3, and refers to the following values "a", "b" and "c" described within I/O thread management table 204-3:

a: job maximum I/O thread number
b: number of already-generated I/O threads
c: number of I/O threads on which I/O processes are currently performed.

Where the values a, b and c are integers equal to or greater than 0, respectively.

Here, the following three cases are considered:

$$b > c \quad [1]$$

$$b <= c, b < a \quad [2]$$

$$b >= a \quad [3]$$

For Case [1], there is one or more available thread. Thus, one I/O thread that is not currently used (that is, an I/O in-use flag is not set) is selected from the I/O thread management table 204-3. The I/O in-process flag is then set for the selected I/O thread in the I/O thread management table 204-3 to allow the I/O thread 205 in which the waiting module 205-1 places the I/O thread 205 into the waiting state for an I/O request to be re-executed.

For Case [2], the thread generator 204-2 generates a new thread; there is a room for generating a new thread in Case [2], although the already-generated threads are not available. The newly-generated I/O thread is registered in the I/O thread management table 204-3, and the I/O in-execution flag is set. The generated I/O thread is once stopped by the waiting module 205-1, and thus the newly-generated I/O thread 205 is re-executed.

For Case [3], no already-generated thread is available and no I/O thread can be newly generated, since the number of I/O thread has already reached the job maximum I/O thread number. In this case, the I/O buffer management table 204-5 remains responsible for the control procedure until the I/O thread 205 currently in process becomes available.

The I/O buffer securement module 204-4 then refers to the I/O buffer management table 204-5 to fine an I/O buffer which is not currently used (for which the in-use flag is not set), for being placed again into the waiting state for the reception from the common process daemon 202. If no I/O buffer is found which is not currently used, one I/O buffer is newly secured, and the reception wait flag is set. The newly secured I/O buffer is then registered in the I/O buffer management table 204-5. If an I/O buffer which is not currently used is found out, the reception wait flag is set for the corresponding entry of the I/O buffer management table 204-5. Then, the I/O daemon 204 is placed into the reception waiting state by the inter-process communicator 204-1, with the newly secured I/O buffer as the reception region. When the number of the I/O buffers already reaches the allowed maximum value in trying to newly secure an I/O buffer, the I/O buffer waiting module 204-6 waits for the buffer currently in use to be released.

When the I/O thread 205 is re-executed by the I/O daemon 204, the I/O module 205-2 searches the I/O buffer management table 204-5. The I/O thread 205 then selects an I/O buffer for which the I/O waiting flag is set, and the I/O waiting flag is reset, and the I/O in-execution flag is set. Next, the newly-generated or already available I/O buffer is referred, and the I/O daemon 204 determines the type of the system call (such as read and write operations).

For a system call in which the path name of the file or directory is specified by an argument, such as a system call requesting an operation other than read and write operations (e.g. an open operation), an open system call is actually issued with the path name of the file or directory and the other arguments specified.

For a system call requesting a read or write operation, for which an open operation is already performed on the file, the file management table 204-8 is searched by using the IP address of the compute node, the PID of the process requiring the I/O operation, and the FD, which are stored within the I/O buffer, as a key to thereby obtain the FD defined on the corresponding I/O node.

Next, an lseek system call is used to move the offset of a target file to the specified position. Then, the FD, the address of the storage position of the I/O data of the I/O buffer, and the I/O size are specified to actually issue a read/write system call.

For a system call in which an FD is specified by an argument (such as a system call requesting an operation other than open, read and write operations), for which an open operation is already performed on the file, the file management table 204-8 is searched by using the IP address of the compute node, the PID of the process requiring the I/O operation on the compute node, and the FD stored within the I/O buffer as a key to obtain the FD defined on the corresponding I/O node. This is followed by executing the system call with necessary arguments specified, depending on the kind of the specified system call.

After the subsequent return from the system call, an FD is returned as the return value for the case of the open operation, when any error (such as the non-existence of the target file) does not occur. The returned FD is stored at a predetermined position of the associated I/O buffer together with the FD of the compute node, the IP address and the PID of the process requiring the I/O operation on the compute node. In the case except for the open operation, the return value and an error code are stored at a predetermined position of the I/O buffer.

This is followed by resetting the corresponding I/O in-execution flag and setting the corresponding return waiting flag. The I/O daemon transmission thread 206 is then re-executed. The I/O buffer management table 204-5 is then searched again to find an I/O buffer for which the I/O waiting flag is set. When there is an I/O buffer for which the I/O waiting flag is set, the I/O process for the I/O buffer is executed, resetting the I/O waiting flag and setting the corresponding I/O in-execution flag. When there is no I/O buffer for which the I/O waiting flag is set, the I/O thread 205 is placed into the waiting state by the waiting module 205-1.

When being re-executed, the I/O daemon transmission thread 206 determines whether an I/O buffer for which the return waiting flag is set is found in the I/O buffer management table 204-5. If not, the I/O daemon transmission thread 206 is placed into the waiting state, again. If there is an I/O buffer for which the return waiting flag is set, the inter-process communicator 206-1 transmits the requested packet to the common process daemon transmission thread 203, resetting the return waiting flag. At this time, the I/O buffer waiting module 204-6 re-executes the I/O daemon 204, when the I/O daemon 204 waits for an I/O buffer to become available.

The common process daemon transmission thread 203, which receives the packet from the I/O daemon transmission thread 206 by using the inter-process communicator 203-3, transmits to the corresponding compute node the data received from the I/O daemon transmission thread 206 and stored in the communication buffer 203-2 as a system call reply packet, by using the transmitter module 203-1.

In the corresponding compute node, the system call reply packet is received by the communication module 301 and the error number described in the received packet is then referred. When the error number is set to a value other than zero to indicate that some error occurs, the error number and the return value are returned as they are to the user process to complete the process, independently of the kind of the system call. When the error number is set to zero, the system call of interest is not a read or write system call and there are data to be returned, the data are copied to the address specified by the user process, and the return value is returned as it is to the user process. Then, the process is completed. When the system call of interest is a read or write system call, the offset of the file is increased by the return value, and the return value is returned as it is to the user process. Then, the process is completed.

It should be noted that exclusive control is used in referring, adding or updating the respective tables and buffers for the consistency.

In summary, the computer system of this embodiment is based on an idea in which the I/O nodes 20-1 to 20-*m* shown in FIG. 2 are regarded as the I/O resource. One finding is that the necessary amount of the I/O resource depends on jobs; some jobs requires multiple compute nodes and only one I/O node, while other jobs requires I/O nodes the number of which is equal to the number of required compute nodes. Based on this finding, the system of this embodiment dynamically allocates the necessary I/O resource to respective jobs, when multiple jobs are executed at the same time. This allows efficient use the I/O resource.

The execution of a job may be unable to be started when a required amount of resources, such as the number of the compute nodes and the memory capacity; however, as for the case the I/O nodes is regarded as the I/O resource, as described in this embodiment, the execution of a job is not always impossible even if all of the required I/O resources is not secured, which may result in the increase in the execution time of the job. In this embodiment, the job scheduler 101 provides job scheduling in which the execution of the job is started even if a desired amount of the I/O resource is not perfectly secured for the job at the start of the job. When any I/O resource becomes available, the I/O resource which has newly become available is dynamically allocated to a currently-executed job which suffers from lack of the I/O resource. This allows efficient use of the I/O resources.

FIG. 1C is a schematic view showing an exemplary I/O resource control procedure for efficient use of the I/O resources in this embodiment. In the procedure shown in FIG. 1C, job #1 is being executed when job #2 is started. For this reason, the occupation ratio of 33% is once secured for job #2, and job #2 is then started, although job #2 originally requires an occupation ratio of 75%. After the job #1 is then completed, the occupation ratio of the I/O resource for job #2 is increased up to an occupation ratio of 75%, which is originally requested. Such procedure allows starting job #2 simultaneously with the submission of job #2, providing efficient use of the I/O resources.

Advantageous effects of the parallel computer system of this embodiment are listed in the following. First, even when the execution of other jobs disables the allocation of the occupation ratios of the required I/O nodes to the job of interest at the time of the submission, the occupation ratio allocated to the job of interest is increased up to the requested value as soon as a certain job is completed and becomes available. The I/O node control procedure of this embodiment does not require stopping the job of interest or I/O processes executed for the job of interest.

This advantage results from the following control procedure: Upon the completion of another job, the I/O node scheduler 102 refers to the job management table 102-3 and checks whether there is a currently-executed job suffering from lack of the occupation ratio. If so, a packet instructing a change of the occupation ratio is transmitted through the compute node to the relevant I/O node. In the I/O node receiving this packet, the I/O daemon 204 corresponding to the job of interest controls the job maximum I/O thread number stored in the I/O thread management table 204-3.

Second, the parallel computer system of this embodiment provides efficient use of the I/O resources for each job, since the necessary I/O resource can be dynamically allocated in units of jobs when even if the system is shared by multiple jobs. This advantage results from the configuration in which the correlation between the compute nodes and the I/O nodes is not fixed and the I/O node scheduler dynamically allocates the I/O resources in accordance with the requests from each job.

Third, the parallel computer system of this embodiment allows each job to use necessary I/O resource without any loss of the process quantity per unit time (or throughput) in I/O operations, and allows the jobs to efficiently share the I/O resources. This advantage results from the configuration in which the occupation ratio of each I/O node is dynamically allocated for each job, on the basis of the job's requirement, with the allowed maximum number of the I/O threads of each I/O node used as the upper limit, Fourth, the parallel computer system of this embodiment effectively avoids a problem that the file system connected to the I/O nodes is overloaded, causing the delay of the process. This advantage results from the configuration in which the occupation ratio of each I/O node to be used is declared at the time of submitting the job, the I/O node scheduler secures the I/O node in accordance with the declaration, and I/O requests are never issued from the I/O node beyond the maximum number of the I/O threads, which is determined based on the secured occupation ratio.

Fifth, the parallel computer system of this embodiment provides efficient parallel I/O operations by allowing multiple compute nodes to use multiple I/O nodes when the file system connected to the I/O nodes is the parallel file system. This advantage results from the configuration that an I/O node optimal for parallel I/O operations is allocated to a job which requires parallel I/O operations.

Sixth, the parallel computer system of this embodiment avoids overhead caused by the I/O data hand-over, eliminating the need for copying I/O data among memories for the I/O daemon 204 and the I/O thread 205 and I/O daemon transmission thread 206 which are administrated by the I/O daemon 204. This advantage results from the configuration that the I/O thread 205 and the I/O daemon transmission thread 206 together with the I/O daemon 204 are able to share a memory, since the I/O buffer management table 204-5 within the I/O daemon 204 singly manage the I/O data using the thread-based control.

Seventh, the parallel computer system of this embodiment allows a compute node to use a file system which is not supported by the compute node through the I/O node in the case when the file system is supported by the I/O node. This effectively eliminates the need for implementing all the file systems that are desired to be used the compute node, allowing use of a size-reduced operation system that is specialized to only the process necessary for a calculation. As a result, the overhead of system resources which are occupied by the operating system, such as memories, is effectively reduced. This advantage results from the configuration in which the compute node do not need functions for I/O processes, such as an I/O driver, and a file system, since the process of the system call related to the I/O operation called on the compute node is executed on the I/O node.

The present invention is preferably used in an environment in which calculation resources including the I/O resources are divisionally used, in such a case when multiple jobs require different resources are executed on the parallel computer system, in the field such as HPC (High Performance Computing) in which the large scale of data must be processed at a high speed.

It is apparent that the present invention is not limited to the above-described embodiments, which may be modified and changed without departing from the scope of the invention.

What is claimed is:

1. An I/O node control system, comprising:
   a file system storing data;
   I/O nodes on which I/O threads are run to access said file system;
   compute nodes which execute jobs and issue an I/O request which requests an access to said file system by using I/O threads when an I/O operation occurs in said jobs; and
   a job server which provides job scheduling and dynamically determines, for a certain job, a number of allocated ones of said I/O nodes and allocated I/O node occupation ratios which are ratios of job maximum I/O thread numbers, which are numbers of I/O threads allowed to be occupied by the job, to I/O node maximum I/O thread numbers, which are maximum numbers of I/O threads allowed to be generated in the allocated I/O nodes without stopping execution of the job,
   wherein said job server includes an I/O node scheduler which, when being not able to fully secure a corresponding number of I/O threads to said I/O node occupation ratios requested by a job upon start of the job, allows the job to occupy a number of I/O threads of said I/O nodes so as to satisfy an I/O node occupation ratio reduced down to a securable value.

2. The I/O node control system according to claim 1, wherein, when a job is completed, said I/O node scheduler releases I/O threads of said I/O nodes used by the completed job, and when an other job occupies I/O threads of said I/O nodes so as to satisfy the I/O node occupation ratio determined to be reduced to down to the securable value, reduces a shortage of said I/O node occupation ratio of said other job by allocating said released I/O threads to said other job.

3. The I/O node control system according to claim 2, wherein said I/O node scheduler includes a job management table storing, for each job, compute node numbers of one or more compute nodes used for executing of the each job, I/O node numbers of one or more I/O nodes which are allocated to each of said one or more compute nodes, and said I/O node occupation ratio secured for each of said one or more I/O nodes.

4. The I/O node control system according to claim 3, wherein said job management table further stores a shortage of said I/O node occupation ratio which is not secured, for each of said one or more I/O nodes, and
   wherein, when being unable to occupy I/O threads of said I/O nodes for a job so as to satisfy said I/O node occupation ratios requested by the job at a start of the job, said I/O node scheduler stores the shortage of said I/O node occupation ratio which is not secured.

5. The I/O node control system according to claim 4, wherein, when a job is completed, said I/O node scheduler releases I/O threads of said I/O nodes used by the job, removes an entry associated with said completed job from said job management table, and allocates the released I/O threads of the each I/O node with reference to a shortage of said I/O node occupation ratio described in said job management table, when any of other jobs does not occupy I/O threads of said I/O nodes so as to satisfy said requested I/O occupation ratios.

6. The I/O node control system according to claim 5, wherein said job management table stores job start times, and
   wherein, in a case where, upon a completion of a job and releases of I/O threads of said I/O nodes occupied by the job, there are a plurality of other jobs which have occupied I/O threads of said I/O nodes so as to satisfy said I/O node occupation ratio determined to be reduced down to the securable value, said I/O node scheduler calculates elapsed times from starts of the other jobs from said job start times and a current time, calculates ratios of shortages of said I/O node occupation ratios to said I/O node occupation ratios requested at starts of the jobs as occupation ratio shortage ratios with reference to said job management table, and selects an optimum job by dynamically allocating said I/O node occupation ratios occupied by I/O threads of the respective released I/O nodes based on said elapsed times and said occupation ratio shortage ratios.

7. The I/O node control system according to claim 6, wherein said I/O node scheduler further includes: an I/O node management table describing, for each of said I/O nodes, an I/O node used percentage indicative of a sum of said I/O node occupation ratios allocated to respective jobs and said allowed maximum I/O thread number, and
   wherein said I/O node scheduler calculates said job maximum I/O thread numbers by using said I/O node occupation ratios described in said job management table and said allowed maximum I/O thread numbers described in said I/O node management table, and informs the respective I/O nodes of said job maximum I/O thread numbers.

8. The I/O node control system according to claim 7, wherein, when said I/O node used percentages are changed due to a completion of a job, said I/O node scheduler stores said I/O node used percentages after the change into said I/O management table, and
   wherein, when updating said I/O node occupation ratio of an other job stored in said job management table in response to said I/O node used percentages being changed, said I/O node scheduler informs a relevant I/O node of said I/O node occupation ratio updated and a job maximum I/O thread number of said other job updated based on maximum I/O thread numbers of said I/O nodes.

9. The I/O node control system according to claim 8, wherein said I/O nodes each include:
   said I/O threads performing I/O operations for said file system; and
   an I/O daemon provided with a thread generator which generates said I/O threads to be allocated to the job within said job maximum I/O thread number informed from said I/O node scheduler.

10. The I/O node control system according to claim 9, wherein said I/O daemon includes an I/O thread management table describing said job maximum I/O thread number informed from said I/O node scheduler, and updates said job maximum I/O thread number described in said I/O thread management table when informed of update of said job maximum I/O thread number from said I/O node scheduler, and
    wherein said thread generator refers to said I/O thread management table in generating said I/O threads, and generates said I/O threads to be allocated to the job within said job maximum I/O thread number.

11. The I/O node control system according to claim 10, wherein said I/O nodes each include I/O buffers for storing I/O data exchanged between said compute nodes and said I/O nodes,
    wherein said I/O daemon further includes an I/O buffer management table for managing said I/O buffers, and
    wherein, in a case where one or more I/O buffers are described as being placed into an I/O waiting state in said I/O buffer management table when said job maximum I/O thread number is increased as a result of an update of said I/O thread management table, said thread generator generates I/O threads to be additionally allocated to the job within said job maximum I/O thread number, a number of said generated I/O threads being a number of said I/O buffers placed into the I/O waiting state.

12. The I/O node control system according to claim 11, wherein said I/O buffers are shared by said I/O threads and said I/O daemon.

13. The I/O node control system according to claim 12, wherein, in starting a job, said job server receives a request indicative of a number of I/O nodes and I/O node occupation ratios necessary for the job, and dynamically determines a number of allocated ones of said I/O nodes and allocated I/O node occupation ratios for the job based on said request.

14. An I/O node control method, comprising:
    in a case where, in starting a certain job requesting I/O node occupation ratios which are ratios of job maximum I/O thread numbers, which are numbers of I/O threads allowed to be occupied by the job, to I/O node maximum I/O thread numbers, which are maximum numbers of I/O threads allowed to be generated in I/O nodes, a number of I/O threads corresponding to the I/O node occupation ratio requested by said certain job cannot be secured,
    allocating some of I/O threads satisfying said requested I/O node occupation ratios with I/O threads of said I/O node secured so as to satisfy an I/O node occupation ratio determined to be reduced down to a securable value; and upon a completion of an other job, releasing I/O threads of I/O nodes used by the other job and dynamically allocating to said certain job I/O threads corresponding to a shortage from the I/O threads necessary for satisfying said I/O node occupation ratios requested at a start of the job, without stopping execution of said certain job, wherein said I/O threads run on said I/O nodes.

15. The I/O node control method according to claim 14, further comprising:

providing a job management table describing, for each job, one or more compute node executing the each job, one or more I/O nodes allocated to each of said one or more compute nodes and an I/O node occupation ratio secured for each of said one or more I/O nodes, wherein said allocating some of I/O threads includes: storing a value determined by reducing said I/O node occupation ratio requested by said certain job down to a securable value, instead of the I/O node occupation ratio requested, and wherein said dynamically allocating includes: storing in said job management table a value determined by increasing said value determined by the reduction, up to said I/O node occupation ratio requested by said certain job.

16. The I/O node control method according to claim 15, wherein said providing includes providing the job management table so as to further describe a shortage of said I/O node occupation ratio which cannot be secured for each of said one or more I/O nodes, and wherein said allocating some of I/O threads includes: storing in said job management table a shortage of said I/O node occupation ratio which cannot be secured at a start of said certain job.

17. The method according to claim 16, wherein said dynamically allocating further includes:

when said other job is completed, releasing I/O threads of I/O nodes used by said other job and deleting an entry associated with said other job form said job management table; and dynamically allocating I/O threads of said released I/O nodes to said certain job based on said job management table from which the entry associated with said other job is deleted.

18. The method according to claim 17, wherein said providing includes:

providing the job management table so as to further storing job start times, and wherein said dynamically allocating includes:

in a case where there are a plurality of jobs for which I/O node occupation ratio shortages occur from the requested I/O node occupation ratios when said other job is completed and the I/O threads of the I/O nodes used by said other job are released, calculating elapsed times from starts of the jobs from said job start times and a current time and ratios of shortages of said I/O node occupation ratios to said I/O node occupation ratios requested at starts of the jobs as occupation ratio shortage ratios with reference to said job management table; and dynamically allocating said I/O node occupation ratios occupied by respective I/O threads of each released I/O node based on said elapsed times and said occupation ratio shortage ratios.

19. The I/O nod control method according to claim 18, further comprising:

preparing an I/O node management table describing, for each of said I/O nodes, an I/O node used percentage indicative of a sum of said I/O node occupation ratios allocated to respective jobs and said allowed maximum I/O thread number, wherein said allocating some of I/O nodes further includes: calculating said job maximum I/O thread numbers by using said I/O node occupation ratios described in said job management table and said allowed maximum I/O thread numbers described in said I/O node management table, and informs the respective I/O nodes of said job maximum I/O thread numbers.

20. The I/O node control method according to claim 19, wherein said dynamically allocating further includes:

when said I/O node used percentages are changed due to a completion of a job, storing said I/O node used percentages after the change into said I/O management table, and updating said I/O node occupation ratio of an other job stored in said job management table in response to a change in said I/O node used percentages; and informing said I/O node occupation ratio updated and a job maximum I/O thread number of said other job updated based on maximum I/O thread numbers of said I/O nodes to a relevant I/O nodes.

21. The method according to claim 20, wherein said informing to the relevant I/O node includes:

generating I/O threads which performs I/O operations of the job in the relevant I/O node within said job maximum I/O thread number.

22. The method according to claim 21, wherein said informing to said relevant I/O node includes:

increasing said job maximum I/O thread number from a value given at a start of said job to the job maximum I/O thread number informed from the job server, and generating I/O threads to be allocated to the job within the increased job maximum I/O thread number.

23. The method according to claim 22, wherein said informing to said relevant I/O node further includes:

in a case where there are I/O buffers placed into an I/O waiting state when said job maximum I/O thread number is increased, generating I/O threads to be additionally allocated to the job within said job maximum I/O thread number, a number of said generated I/O threads being a number of said I/O buffers placed into the I/O waiting state.

24. The method according to claim 23, wherein said allocating some of I/O threads further includes:

receiving a request indicating a number of I/O nodes and I/O node occupation ratios necessary for said certain job from a user.

* * * * *